United States Patent [19]

Nomura et al.

[11] Patent Number: 4,779,138

[45] Date of Patent: Oct. 18, 1988

[54] COMPACT LIQUID CRYSTAL TELEVISION RECEIVER HAVING INFORMATION MEMORY

[75] Inventors: Yoshio Nomura, Iruma; Shunji Nakano; Akihiro Tsukamoto, both of Tokyo, all of Japan

[73] Assignee: Casio Computer Co., Ltd., Tokyo, Japan

[21] Appl. No.: 933,086

[22] Filed: Nov. 20, 1986

[30] Foreign Application Priority Data

Nov. 27, 1985 [JP] Japan ............................... 60-266964
Nov. 27, 1985 [JP] Japan ............................... 60-266965
Nov. 27, 1985 [JP] Japan ............................... 60-266966

[51] Int. Cl.⁴ ......................... H04N 5/64; H04N 7/08
[52] U.S. Cl. ................................. 358/236; 358/254; 358/142; 434/179; 364/705.05
[58] Field of Search ............... 358/236, 189, 254, 102, 358/142; 364/705; 369/10; 455/345, 347; 273/148 B, DIG. 28; 434/308, 179

[56] References Cited

U.S. PATENT DOCUMENTS

| 4,120,037 | 10/1978 | Sato | 364/705 |
| 4,160,242 | 7/1979 | Fowler et al. | 434/179 |
| 4,388,645 | 6/1983 | Cox et al. | 358/142 |
| 4,396,941 | 8/1983 | Nishimura et al. | 358/254 |
| 4,491,979 | 1/1985 | Ogasawara et al. | 358/254 |
| 4,639,225 | 1/1987 | Washizuka | 358/254 |
| 4,680,629 | 7/1987 | Fukushima et al. | 358/142 |

FOREIGN PATENT DOCUMENTS

| 57-141687 | 9/1982 | Japan . |
| 59-188 | 1/1984 | Japan . |
| 60-142567 | 9/1985 | Japan . |
| 61-59587 | 3/1986 | Japan . |

Primary Examiner—Howard W. Britton
Assistant Examiner—John K. Peng
Attorney, Agent, or Firm—Frishauf, Holtz, Goodman & Woodward

[57] ABSTRACT

In a compact liquid crystal television receiver having an information memory, map information, train time table information, or telephone directory information is prestored in the information memory, and is read out therefrom as needed. The readout information data is displayed on a screen, instead of a television image. In the case, window display can be used. The information memory is an IC card, and a still image audio or characters by character broadcasting can be recorded or reproduced.

13 Claims, 19 Drawing Sheets

F I G. 2
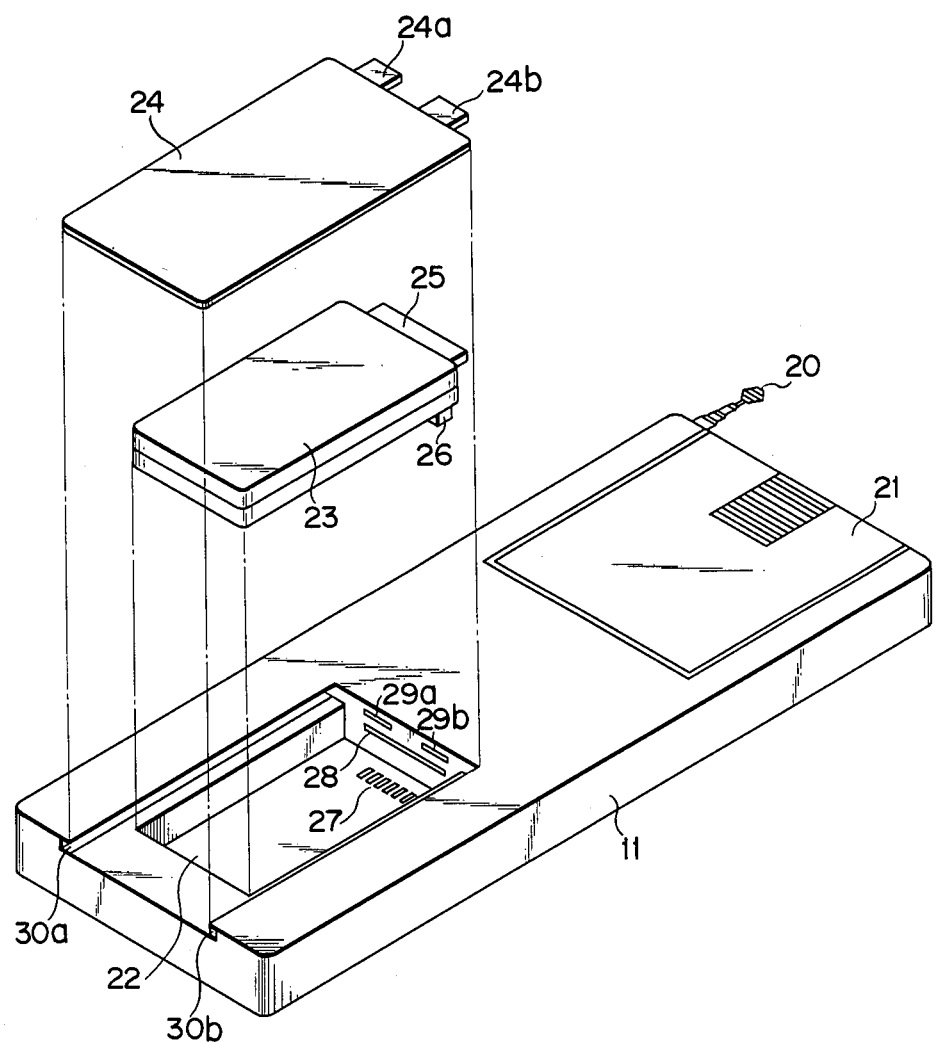

| | | 新大阪着 6100 | | | | | | | | |
|---|---|---|---|---|---|---|---|---|---|---|
| 552.6 | 552.6 発 着 | 新大阪線 | 6日から6両編成 1〜7号車の中東全車自由席・女なし まで | 全車自由席 普通車 | (6両編成全車自由席・女なし)〈運転注意日〉 | 全車自由席 普通車 | ㉑ | ㉒ | ㉑ | ㉑ |
| 552.6 | 552.6 | 新大阪発 6100 | | | | | 600 | 605 | 617 | 635 |
| 589.5 | 589.5 | 新神戸〃 6155 | | | | | 616 | 620 | 632 | 650 |
| 612.3 | 612.3 | 西明石〃 6170 | | | | | ↓ | 632 | ↓ | 702 |
| 644.3 | 644.3 | 姫路〃 6180 | | | | | ↓ | 646 | ↓ | 716 |
| 665.0 | 665.0 | 相生〃 6190 | | | | | ↓ | 657 | ↓ | 727 |
| 732.9 | 732.9 | 岡山着発 6200 | | 625 | | 639 | 701 | 718 | 717 | 748 |
| 758.1 | 758.1 | 新倉敷〃 6210 | | 638 | | 658 | 702 | 719 | 718 | 749 |
| 791.2 | 791.2 | 福山〃 6220 | | 652 | | 715 | 715 | 732 | ↓ | 802 |
| 822.8 | 822.8 | 三原〃 8080 | | 705 | | 733 | ↓ | 746 | 740 | 816 |
| 894.8 | 894.8 | 広島着発 8100 | 730 | 729 | | 753 | 738 | 800 | ↓ | 830 |
| 936.2 | 936.2 | 新岩国〃 8120 | | 730 | | 803 | 802 | 823 | 813 | 853 |
| 983.3 | 987.7 | 徳山〃 8140 | | 749 | | 804 | 803 | 825 | 814 | 901 |
| 1027.6 | 1032.0 | 小郡〃 8150 | | 806 | 846 | 826 | 834 | 843 | ↓ | 919 |
| 1089.3 | 1093.7 | 新下関〃 8170 | | 824 | 908 | | 844 | 901 | 901 | 937 |
| 1108.3 | 1112.7 | 小倉着発 9010 | 752 | 844 | | | 906 | 918 | 858 | 954 |
| 1176.5 | 1180.9 | 博多着 9050 | | 854 | | 803 | 917 | 938 | 925 | 1014 |
| | 到着番線 | | | 855 | | 804 | 918 | 948 | 926 | 1024 |
| | | | | 917 | | 826 | 940 | 949 | 948 | 1025 |
| | | | ⑭ | ⑬ | ⑫ | ⑭ | ⑪ | ⑬ | ⑧ | ⑭ |
| | | | | | 6 | | | | 8 | |

FIG. 6C

| | | |
|---|---|---|
| HOUSE OF REPRESENTATIVES | ※581 5111, | 1-7 NAGATA-CHO, CHIYODA-KU |
| HOUSE OF COUNCILORS | ※581 3111, | 1-7 NAGATA-CHO, CHIYODA-KU |
| COURT OF IMPEACHMENT | 581 3111, | 1-7 NAGATA-CHO, CHIYODA-KU |
| INDICTMENT COMMITTEE | ※581 5111, | 1-7 NAGATA-CHO, CHIYODA-KU |
| CABINET RESIDENCE OF PREMIER | ※581 0101,<br>※581 0241 | 2-3 NAGATA-CHO, CHIYODA-KU |
| SURVEY OFFICE | ※581 2361 | 1-6 NAGATA-CHO, CHIYODA-KU |
| CABINET LEGISLATION BUREAU | ※581 7271, | 3-1 KASUMIGASEKI, CHIYODA-KU |
| FIRST SEC., OFFICE OF DIRECTOR GENERAL | 581 4098 | |
| EXECUTIVE OFFICE, NATIONAL PERSONNEL AUTHORITY | ※581 5311, | 2-1 KASUMIGASEKI, CHIYODA-KU |
| CABINET SECURITY AFFAIRS OFFICE, SECURITY COUNCIL | 581 1966, | 1-6 NAGATA-CHO, CHIYODA-KU |
| PRIME MINISTER'S OFFICE | ※581 2361, | 1-6 NAGATA-CHO, CHIYODA-KU |
| AKASAKA PALACE | ※478 1111, | 2-1 MOTOAKASAKA, MINATO-KU |
| FAIR TRADE COMMISSION | ※581 5471, | 2-2 KASUMIGASEKI, CHIYODA-KU |

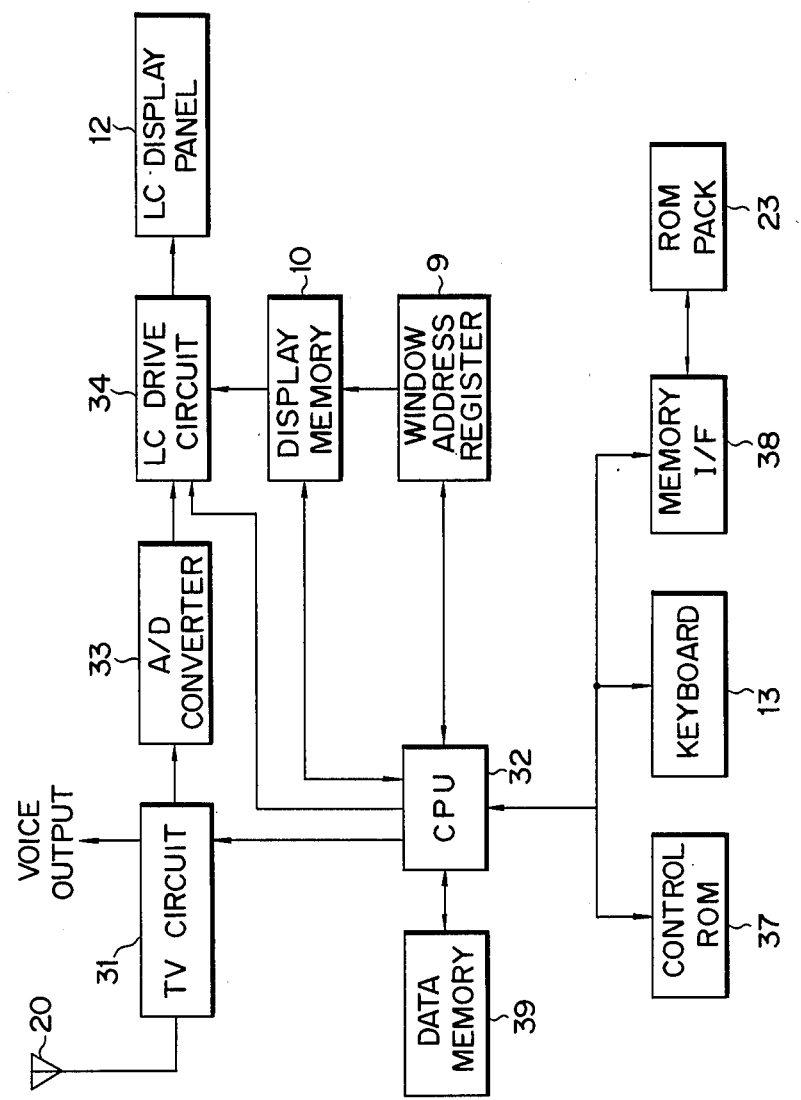
F I G. 7

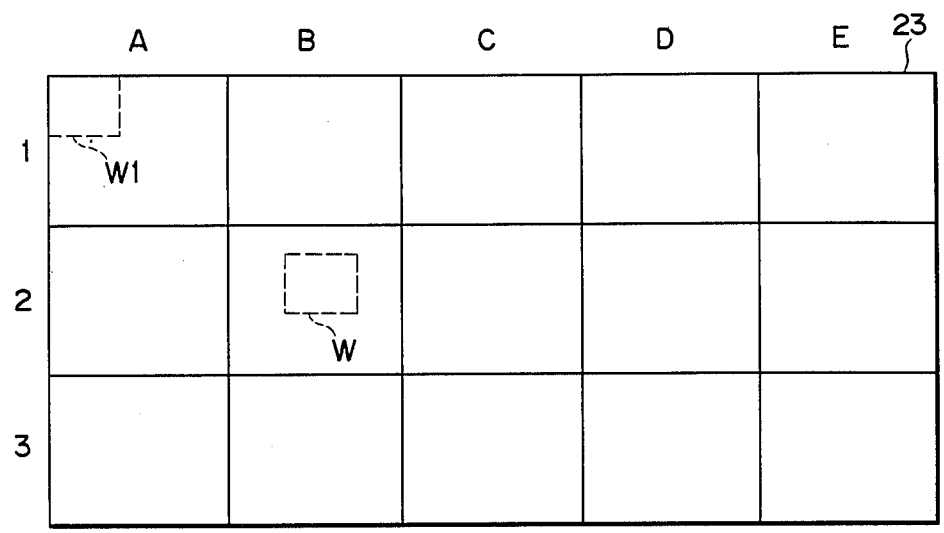

FIG. 10A

TELEPHONE NUMBER REGISTRATION

REGISTRATION MODE [IN]

PERSON'S NAME INPUT [A][O][K][I] [NAME]

NUMBER INPUT [1][2][3][-][4][0][5][0] [TEL]

FIG. 10B

TABLE FORMATION

MODE [SET]

PERSON'S NAME INPUT [A][O][K][I] [NAME] OR SEARCH: TO DISPLAY AOKI

MAP INPUT [M][I][N][A][T][O] [SET]

OR [A][1][SET]

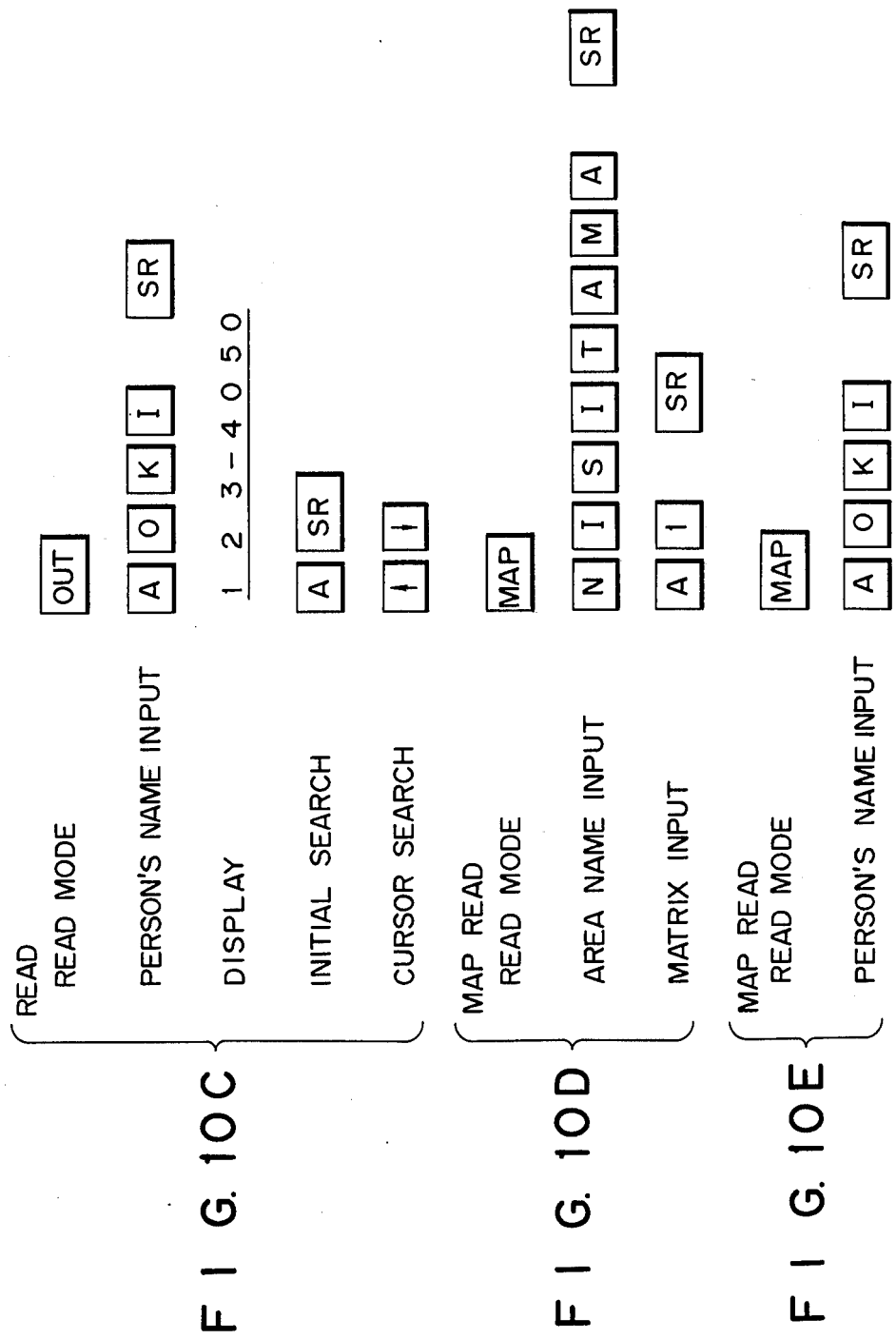

COMPACT LIQUID CRYSTAL TELEVISION RECEIVER HAVING INFORMATION MEMORY

BACKGROUND OF THE INVENTION

The present invention relates to a compact liquid crystal television receiver having an information memory.

In recent years, portable, compact liquid crystal television receivers have been commercially available. Due to portability of liquid crystal television receivers, they are frequently used outdoors while users are out or travel. A conventional liquid crystal television receiver has a display screen as relatively large as 2"×5", as compared with a display screen size of a portable electronic calculator. In order to satisfy demand arisen for conveniently displaying information such as a map of a destination during travel, a time table of trains, telephone numbers on a display screen, various types of versatile portable electronic apparatuses have been developed, as described in Japanese Patent Disclosure (Kokai) No. 59-188. Display information in such an electronic apparatus is stored in a memory card. In this case, in order to display different pieces of information, the memory card must be replaced with another card. While the user watches a liquid crystal television outdoors, he often wants to record a displayed image as a still image. Japanese Utility Model Disclosure (Kokai) No. 60-142567 describes an apparatus capable of recording a still image. However, recording of a still image is performed by using a magnetic tape. As a result, the apparatus becomes bulky and power consumption is undesirably high.

A window display system is available as a conventional image display technique, as disclosed in Japanese Patent Disclosure (Kokai) No. 57-141687. It is also apparent from Japanese Patent Disclosure (Kokai) No. 61-59587 that the information is stored in an IC card. However, no conventional techniques can provide a portable, compact liquid crystal television receiver having an information memory, capable of window-displaying various pieces of information including particularly a map, as needed, and capable of recording still images, audio signals, and characters from character broadcast, and reproducing these images, signals, and characters.

SUMMARY OF THE INVENTION

The present invention has been made in consideration of the situation described above, and has as its object to provide a compact liquid crystal television receiver having an information memory, capable of storing information data such as a map, a time table, and telephone numbers in the information memory, and capable of displaying any information on a liquid crystal display.

In order to achieve the above object of the present invention, there is provided a compact liquid crystal television receiver having an information memory, comprising: television linear circuit means for receiving a television wave to produce video and audio signals; A/D converting means for sampling the video signal from the linear circuit means and converting the video signal into digital video data; memory means for storing information data; key input means including a mode switch for selecting one of a television display mode and an information display mode and area designating means for reading out information data from part of a storage area of the memory means to designate a window area for displaying a window; liquid crystal display means for displaying an image; liquid crystal driving means, connected to the A/D converting means and the liquid crystal driving means, for receiving digital video data output from the A/D converting means and the information data output from the memory means and for displaying a television image and the information data on the liquid crystal display means; means, connected to the key input means and the liquid crystal driving means, for reading out the information data stored in a window area designated by the area designating means, for supplying the readout information data to the liquid crystal driving means, and for causing the liquid crystal display means to display the readout information data; and a case for accommodating the respective means.

With the above arrangement, the compact liquid crystal television receiver having the information memory can store map information, train time table information, and telephone number information in the information memory, read out necessary information data, and display an image of the readout data instead of displaying a television image. If stored information represents a map, a correspondence between the map window address and items such as a telephone number, a name, and a company name is established. If the map is accessed, the map area of the corresponding portion is automatically window-displayed. The compact liquid crystal television receiver according to the present invention has a detachable IC card. A desired television signal such as a still image, an audio signal, and characters from the character broadcast is stored in a memory of the IC card and is reproduced therefrom.

BRIEF DESCRIPTION OF THE DRAWINGS

FIG. 2 is a partially exploded perspective view showing a ROM pack mounting portion formed in the lower surface of a case in FIG. 1;

FIGS. 4A to 4C are views showing key depression sequences for displaying storage information of the attached ROM pack;

FIG. 6B is a train time table as a display example of data read out from the ROM pack;

FIG. 6C is a telephone directory of Japanese administrative organizations as a display example of data read out from the ROM pack;

FIG. 7 is a block diagram of an electronic circuit according to another embodiment of the present invention;

FIG. 8 is a memory map of a ROM pack used in the embodiment of FIG. 7;

FIG. 9 is a table showing the relationship between the memory areas and the items stored in the information memory;

FIGS. 10A and 10B are views showing key operation sequences in the registration mode of the information data and its table formation mode, respectively;

FIGS. 10C to 10E are views showing key depression sequences readout operations of the information data;

DETAILED DESCRIPTION OF THE PREFERRED EMBODIMENTS

Figure 1:
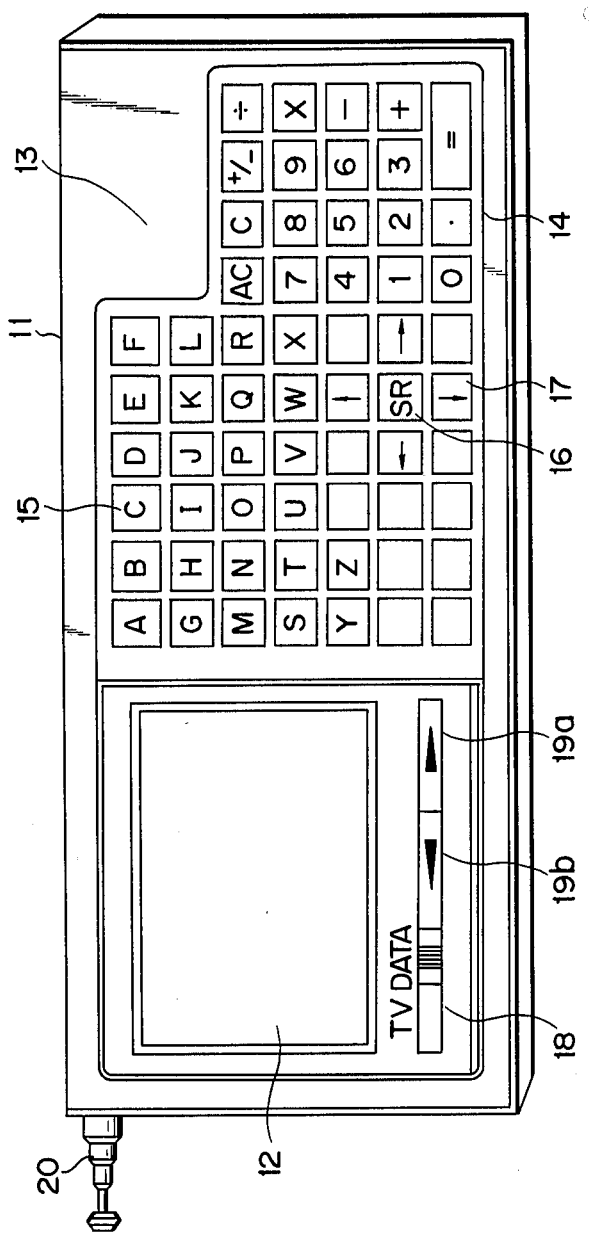
FIG. 1 is a front view showing the outer appearance of a compact liquid crystal television receiver having an information memory according to the present invention.

An embodiment of the present invention will be described with reference to the accompanying drawings. The outer appearance of a compact liquid crystal television receiver will be described with reference to FIGS. 1 and 2. Referring to FIG. 1, reference numeral 11 denotes a case. Liquid crystal display panel 12 is arranged in the left portion of the front surface of case 11, and keyboard 13 is arranged in the right portion of the front surface thereof. Keyboard 13 includes calculation keys 14 consisting of numerical keys and function keys. Keyboard 13 also includes letter keys 15, search key 16, and cursor shift keys 17. Shift keys 17 consist of four keys, i.e., " ↑ ", " ↓ ", "←" and "→" respectively used to shift the cursor upward, downward, in the left, and in the right. Keyboard 13 also includes mode switch 18, channel-up key 19a, and channel-down key 19b. Switch 18 and keys 19a and 19b are arranged below panel 12. Rod antenna 20 can extend from the upper side wall of case 11. The proximal portion of antenna 20 is pivotally mounted on case 11.

As shown in FIG. 2, battery storage portion 21 and ROM pack mounting portion 22 are formed in the lower surface of case 11. ROM pack 23 as an information memory is mounted in mounting portion 22. Cover 24 is attached to cover the opening of mounting portion 22. Locking piece 25 is mounted on one side of pack 23. Terminals 26 are arranged on one side of the lower surface, that is, the side with locking piece 25. Locking pieces 24a and 24b are attached to one distal end of cover 24. Contacts 27 are formed on the bottom of ROM pack 23 so as to respectively correspond to terminals 26. Slit 28 is formed in one side wall to engage with locking piece 25 of pack 23. Slits 29a and 29b are formed above slit 28 in ROM pack mounting portion 22 to receive locking piece 24a and 24b of cover 24, respectively. Guide grooves 30a and 30b are formed at both sides of the opening to receive cover 24. In order to mount pack 23 in mounting portion 22, locking piece 25 is inserted in slit 28 to bring terminals 26 into contact with corresponding contacts 27. Thereafter, cover 24 is inserted and slid along grooves 30a and 30b of mounting portion 22, and locking pieces 24a and 24b are respectively inserted in slits 29a and 29b, thereby fixing cover 24. ROM pack 23 is a commercially available pack prestoring, for example, a map, a train time table, and telephone numbers and can be mounted in mounting portion 22.

Figure 3:
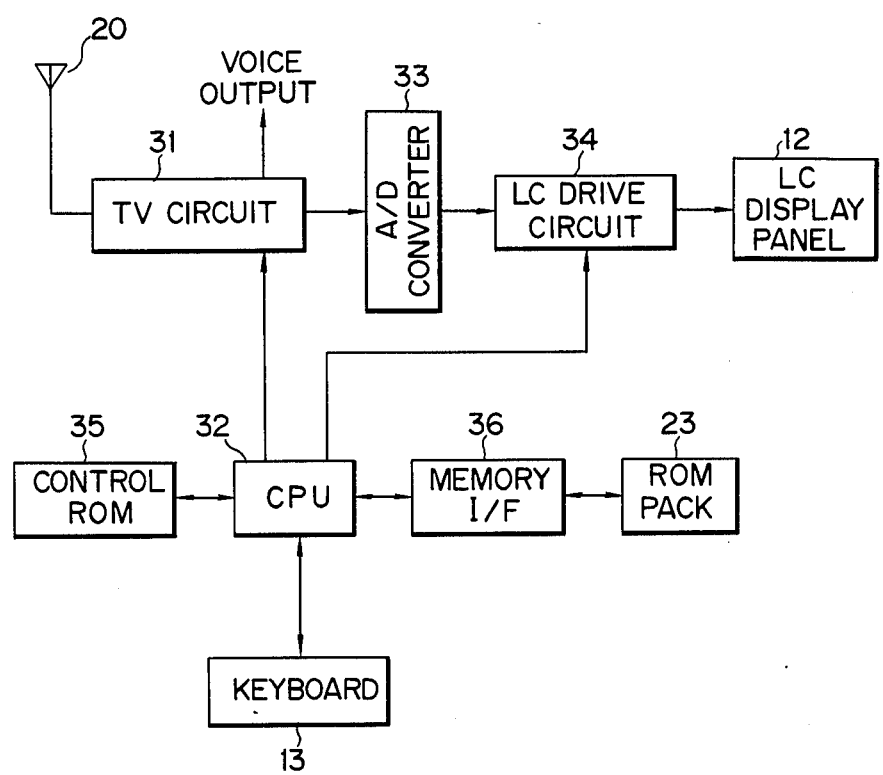
FIG. 3 is a block diagram of an electronic circuit of the compact liquid crystal television receiver according to an embodiment of the present invention.

The arrangement of the electronic circuit in case 11 will be described with reference to FIG. 3. Referring to FIG. 3, reference numeral 31 denotes a TV circuit for selecting a broadcast wave of a desired channel according to an instruction from CPU 32, among television broadcast waves received by antenna 20, and for converting the broadcast wave into an intermediate frequency. TV circuit 31 also performs amplification, video signal detection, sync separation, audio signal detection, and the like. TV circuit 31 supplies a video signal to A/D converter 33 and an audio signal to a loudspeaker (not shown). A/D converter 33 converts the video signal sent from TV circuit 31 into, for example, 4-bit digital video data. The digital video data is output to liquid crystal driver 34. Driver 34 is controlled and operated by CPU 32. If the TV display mode is set, the video data from A/D converter 33 is displayed on liquid crystal display panel 12. However, if the information display mode is set, information from CPU 32 is displayed on panel 12.

Control ROM 35 and keyboard 13 are connected to CPU 32. Keyboard 13 comprises calculation keys 14, letter keys 15, search key 16, cursor shift keys 17, mode switch 18, channel-up key 19a, and channel-down key 19b, as shown in FIG. 1. ROM pack 23 in FIG. 2 is connected to CPU 32 via memory I/F (interface) 36.

The operation of the compact liquid crystal television receiver having the arrangement described above will be described below. In order to receive a television program, the user operates mode switch 18 to select the TV display mode. When the TV display mode is selected by mode switch 18, CPU 32 sends an operation instruction to TV circuit 31 to set the television receiver in the television signal reception enable state. At the same time, driver 34 is switched to the side of A/D converter 33. CPU 32 supplies a channel control signal to TV circuit 31 according to the operating states of keys 19a and 19b. TV circuit 31 selects the channel designated by the channel control signal from CPU 32 and performs amplification, detection, and the like to extract a video signal. The video signal is output to A/D converter 33. Converter 33 converts the video signal supplied from TV circuit 31 into 4-bit video data. The digital video data is output to liquid crystal driver 34. Driver 34 drives liquid crystal display panel 12 according to the video data from A/D converter 33, thereby displaying a television image on the screen.

Figures 4, 5:
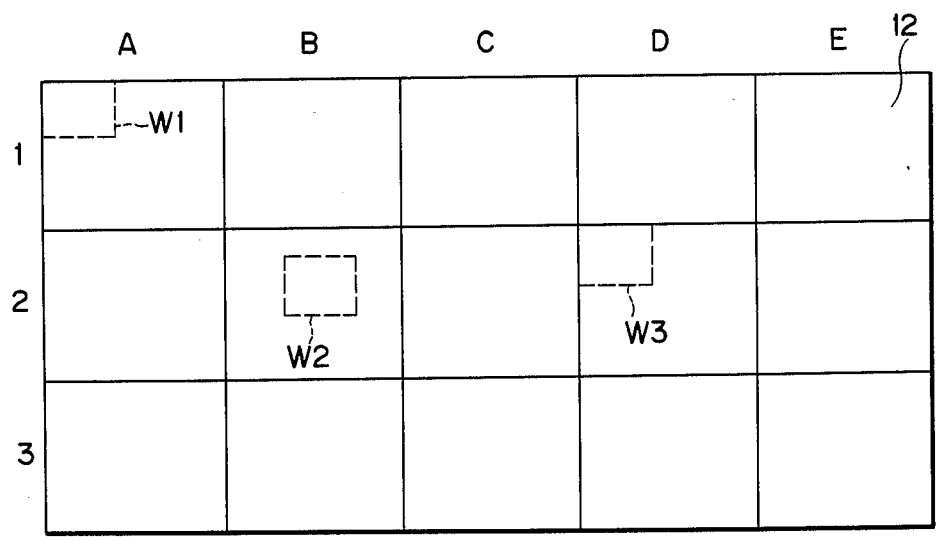
FIG. 5 is a memory map of the ROM pack.
Figure 6A:
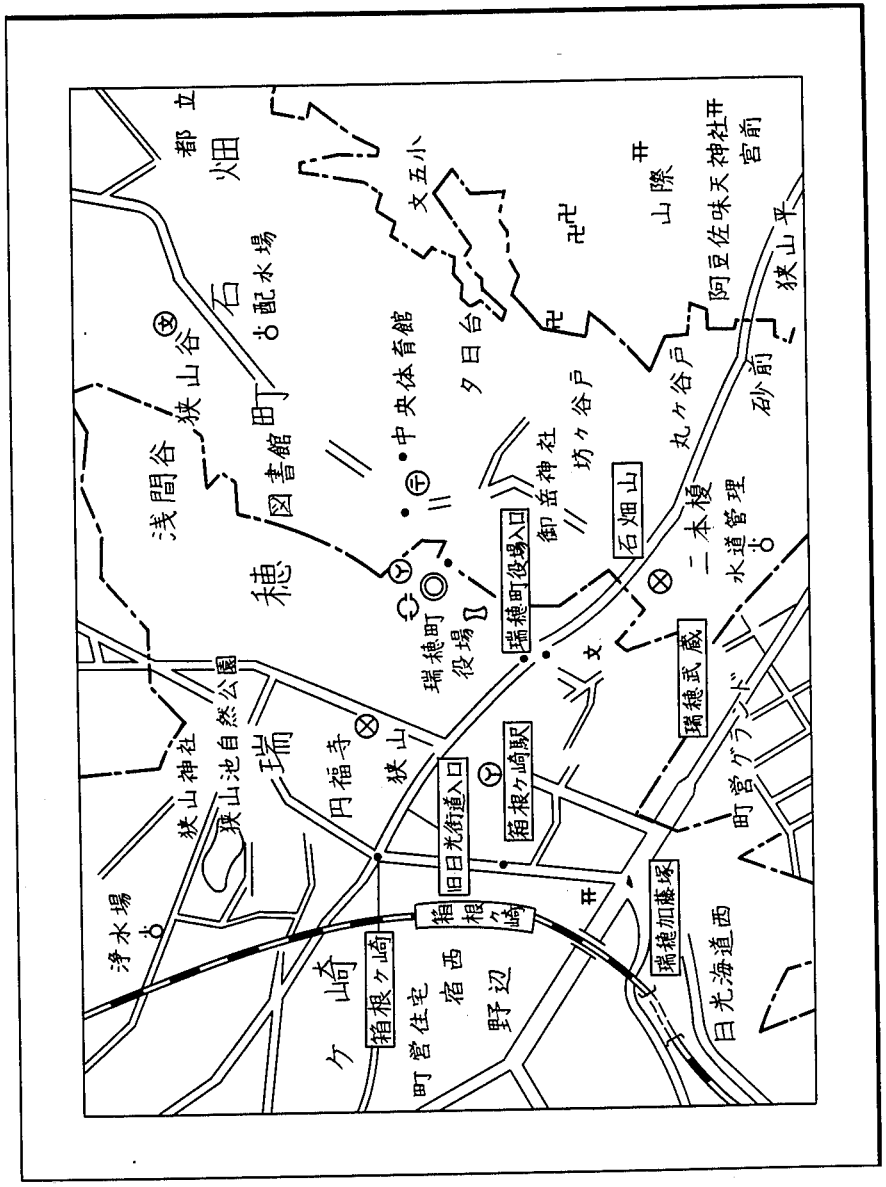
FIG. 6A is a map as a display example of data read out from the ROM pack.

However, if the user wishes to display information such as map information, time table information, or telephone number information, he must select ROM pack 23 storing desired information and mount it into ROM pack mounting portion 22. The user then operates mode switch 18 to set the television receiver in the information display mode. When the information display mode is set by mode switch 18, CPU 32 disables the operation of TV circuit 31. At the same time, liquid crystal driver 34 is switched to the side of CPU 32. In this state, the user depresses letter keys 15 and search key 16 on the keyboard 13 to designate an area to be displayed on liquid crystal display panel 12, among storage information of ROM pack 23. Assume that ROM pack 23 storing map information is mounted in ROM pack mounting portion 22. If the user wishes to display a map of Nishitama-gun, Tokyo, he types "NI-SHITAMA" with letter keys 15, as shown in FIG. 4A, and depresses search key 16. Upon depression of key 16, CPU 32 searches a keyword registered in pack 23 on the basis of the input data. As shown in FIG. 5, a maximum amount of data which can be displayed on panel 12 at one time is specified by window W1 in the memory area of Nishitama-gun. The area of window W1 subjected to first read cycle of ROM pack 23 is predetermined to be the predetermined position, e.g., upper left of the stored map in FIG. 5. Map information read out from pack 23 is supplied to driver 34 under the control of CPU 32 and displayed on panel 12, as shown in FIG. 6A. Part of the map of Nishitama-gun is displayed on panel 12. If the user wishes to see another portion of the map, he operates cursor shift keys 17. Upon operation of keys 17, CPU 32 moves window W to display the other portion on panel 12. FIG. 5 shows an example when window W is shifted from initial position, i.e., W1 to the position of W2. Similarly, any portion of Nishitama-gun can be displayed on panel 12 upon operation of cursor shift keys 17.

If the user wishes to display a train time table on liquid crystal display panel 12, ROM pack 23 storing a train time table is mounted in ROM pack mounting portion 22. The user types a line name with letter keys 15, e.g., "TOKAIDO", as shown in FIG. 4B and depresses search key 16. Upon above key operations, the time table of Tokaido line is displayed on panel 12 in the same manner as in the case of map display.

If the user wishes to display a telephone directory, ROM pack 23 storing a telephone directory is mounted in ROM pack mounting portion 22. The user then types one of the telephone number classifications, i.e., "KUNI" (nation) representing the telephone numbers of Japanese administrative organizations, as shown in FIG. 4C, and depresses search key 16. Upon these key operations, the telephone directory of Japanese administrative organizations is displayed on liquid crystal display panel 12, as shown in FIG. 6C.

In the above embodiment, the information storage area of ROM pack 23 is designated by letter keys 15. However, a storage area may be designated with numerical keys. In this case, the memory area of ROM pack 23 is divided into blocks. The user designates the areas in the form of "A1", "D2", . . . . For example, if the user designates the area of "D2", upper left position W3 in the corresponding area is displayed. In this case, the list of the one-to-one correspondence between the name of city and the window address is described in the instruction manual of the ROM pack as follows:

| A-1 | Mizuho-cho |
| A-2 | Hamura-cho |
| . | |
| . | |
| . | |
| E-3 | Hinode-cho |

In the above embodiment, map information, train time table information, or telephone directory information is displayed on the screen. However, any ROM pack 23 storing any other information can be prepared and the desired information may be displayed on the TV screen in the same manner as in the above embodiment.

In the above embodiment, ROM pack 23 is used as the information memory. However, the information memory may comprise an IC card, a magnetic tape, or the like to obtain the same effect as in the above embodiment.

An arrangement of an electronic circuit in case 11 according to another embodiment of the present invention will be described with reference to FIG. 7. The outer appearance of case 11 in this embodiment is substantially the same as that of FIG. 1 except for an addition of other keys and is not illustrated. Additional keys are IN, OUT, NAME, TEL, SET, and MAP keys. Referring to FIG. 7, reference numeral 31 denotes a TV circuit for selecting a broadcast wave of a desired channel according to an instruction from CPU 32, among the television broadcast waves received by antenna 20, and for converting the received broadcast wave into an intermediate frequency. At the same time, TV circuit 31 performs amplification, video signal detection, sync separation, audio signal detection, and the like and supplies the video signal to A/D converter 33 and the audio signal to a loudspeaker (not shown). A/D converter 33 converts the video signal sent from TV circuit 31 into 4-bit digital video data. This data is sent to liquid crystal driver 34. Driver 34 is operated and controlled by CPU 32. If the television display mode TV is set, the video data from A/D converter 33 is displayed on panel 12. However, if the map display mode MAP is set, the map data sent by CPU 32 from display memory 10 is displayed on panel 12. A predetermined area of memory 10 is addressed by a window address sent from CPU 32 via window address register 9.

Control ROM 37 and keyboard 13 of FIG. 1 are connected to CPU 32. ROM pack 23 in FIG. 2 is connected to CPU 32 via memory I/F (interface) 38. Pack 23 prestores an area map of Japan. The stored map is further divided into areas such as Nishitama-gun and Minato-ku, and the like as shown in FIG. 8. These areas can be addressed in two-dimensional arrays such as A1, B1, . . . .

Data memory 39 is connected to CPU 32. The area of memory 39 is divided into first to third memory areas 39a, 39b, and 39c, as shown in FIG. 9. Names (names of persons and companies) of others such as clients are stored in area 39a, telephone numbers thereof are stored in area 39b, and map areas corresponding to the locations thereof, that is, the window addresses (coordinates of the upper left corners of each area) such as A-1, D-3, B-2, in FIG. 8, and the like are written in area 39c.

The operation of the electronic circuit having the arrangement described above will be described below. In order to receive a television program, the user operates mode switch 18 to set the television display mode TV. When the television display mode TV is set by mode switch 18, CPU 32 supplies an operation instruction to TV circuit 31 to set the receiver in the television program reception enable state, and liquid crystal display 34 is switched to the side of A/D converter 33. Furthermore, CPU 32 supplies a channel control circuit to TV circuit 31 according to the operations of channel-up key 19a and channel-down key 19b. TV circuit 31 selects the channel designated by the channel control signal and performs amplification and signal detection to extract the video signal. The extracted video signal is supplied to A/D converter 33. A/D converter 33 converts the video signal supplied from TV circuit 31 into 4-bit video data. This data is supplied to driver 34. Driver 34 drives liquid crystal display panel 12 according to the video data from A/D converter 33 to display a television image on the screen.

The operation using the map function will be described below. In this case, predetermined data such as the names, telephone numbers, and window addresses is prestored in data memory 39. In order to store data in memory 39, mode switch 18 is switched to the map display mode MAP position. If the map display mode MAP is designated by mode switch 18, CPU 32 disables the operation of TV circuit 31 and at the same time switches driver 34 to the side of display memory 10. In this state, the user registers a telephone number in memory 39 in the following manner. As shown in FIG. 10A, telephone number registration key IN on keyboard 13 is depressed to designate the registration mode. The user then types, with letter keys 15, the name of a person to be registered, e.g., "A", "O", "K", and "I", i.e., Aoki, and depresses person's name registration key NAME. When key "NAME" is depressed, CPU 32 registers the input "AOKI" in first area 39a of data memory 39, as shown in FIG. 9. Subsequently, the user inputs with numerical keys his telephone number, e.g., "123-4050" and depresses telephone number registration key "TEL". Upon depression of key "TEL", CPU 32 registers the input data in second area 39b of data memory 39. By repeating the above operations, person's names (or company names) and the corresponding telephone numbers are sequentially registered in data memory 39.

After the telephone numbers are registered as described above, the user creates a table representing the relationship between the names, telephone numbers, and the map in data memory 39. In this case, as shown in FIG. 10B, the user depresses table formation key "SET" to select the table formation mode and types "A", "O", "K", and "I". The user finally depresses person's name registration key "NAME". In this case, instead of depressing key "NAME", person's name "AOKI" may be read out from area 39a of memory 39 and displayed on liquid crystal display panel 12. In this state, the map area corresponding to his location, e.g., "M", "I", "N", "A","T", and "O", i.e., Minato-ku, Tokyo, or "A" and "1" of ROM pack 23 is designated. Thereafter, the user depresses table formation key "SET". If Minato-ku or the area of "A1" is designated, CPU 32 registers the corresponding window address A-1 in third area 39c of data memory 39.

If the user wishes to check only the telephone number after formation of the table in data memory 39 is completed, he depresses data read key "OUT" to designate a data read mode, as shown in FIG. 10C. The user then types the name of a person, "A", "O", "K", and "I" and depresses search key 16. Upon the above key input operations, CPU 32 reads out telephone number "123-4050" corresponding to name "AOKI" from data memory 39. The readout telephone number is temporarily stored in display memory 10 and then displayed on liquid crystal display panel 12. If the user wishes to search the storage content of memory 39 by designating the initial of a name, for example, the user types "A" as the initial of name "AOKI" and depresses search key 16. In this case, if the user uses cursor up and down keys 17, the storage contents of memory 39 are sequentially searched.

If the user wishes to display a map on liquid crystal display panel 12, he selects ROM pack 23 storing information of a desired area and mounts ROM pack 23 in mounting portion 22. In addition, mode switch 18 is set at the map display mode MAP position. In this state, the user depresses map read key "MAP", as shown in FIG. 10D. Upon depression of key "MAP", the map read mode is designated. The user operates letter keys 15 and search key 16 on keyboard 13 to designate the area to be displayed on panel 12 from the storage information of pack 23. Assume that ROM pack 23 storing a map of Tokyo area is mounted in ROM pack mounting portion 22. If the user wishes to display the map of Nishitama-gun, Tokyo, he types "NISHITAMA" with letter keys 15 or designates area "A1" of ROM pack 23, and depresses key 16, as shown in FIG. 10D. Upon operation of key 16, CPU 32 searches data in ROM pack 23 on the basis of the input data to read out the map of Nishitama-gun area and to store it in display memory 10. In addition, CPU 32 supplies, to window address register 9 (FIG. 7), window address A-1 designating window W1 corresponding to the screen size of panel 12 with reference to the coordinates of the upper left corner of area A-1 of Nishitama-gun, as shown in FIG. 8. The map data of the area corresponding to window W1 is read out from display memory 10 to driver 34 in response to address data from register 9. The readout data is displayed on panel 12 in the same manner as shown in FIG. 6A. In this manner, part of the Nishitama-gun area is displayed on panel 12. If the user wishes to see another part of the Nishitama-gun area, he operates cursor shift keys 17. Upon operation of keys 17, CPU 32 moves window W for display memory 10 according to the input data, so that another part of the Nishitama-gun area is displayed on liquid crystal display panel 12. In the same manner as described above, the user can display any Nishitama-gun area part upon operation of cursor shift keys 17. In addition, other key operations allow display of any area other than the Nishitama-gun area on panel 12 in the same manner as described above.

If the user wishes to display a map of a residence of a person or a location of an office where the person works by designating the name of the person, the following operations are performed in the map read mode, as shown in FIG. 10E. For example, the user types a person's name "A", "O", "K", and "I" and depresses search key 16. Upon depression of key 16, CPU 32 searches data in data memory 39 to read out map area data "A-1" of area 39c which corresponds to name "AOKI". The map data of area "A-1" is read out from ROM pack 23 and stored in display memory 35. CPU 32 then supplies an address of initial window W1 for designated area "A-1" to window address register 9. The map data of initial window W1 area is read out from memory 10 and supplied to liquid crystal driver 34. The data is thus displayed on panel 12 in the same manner as in FIG. 6A. The map displayed on panel 12 can be replaced with another desired map area upon operation of cursor shift keys 17.

A desired map area can be automatically displayed on liquid crystal display panel 12 on the basis of a company name or a telephone number in place of the person's name in the same manner as described above.

In the above embodiment, the map data of the designated area among the map data stored in ROM pack 23 is read out and stored in display memory 10. However, all map data may be read out from ROM pack 23 and may be stored in display memory 10.

In the above embodiment, ROM pack 23 is used as the information memory. However, the information memory may comprise an IC card or a magnetic tape to obtain the same effect.

Figure 11:
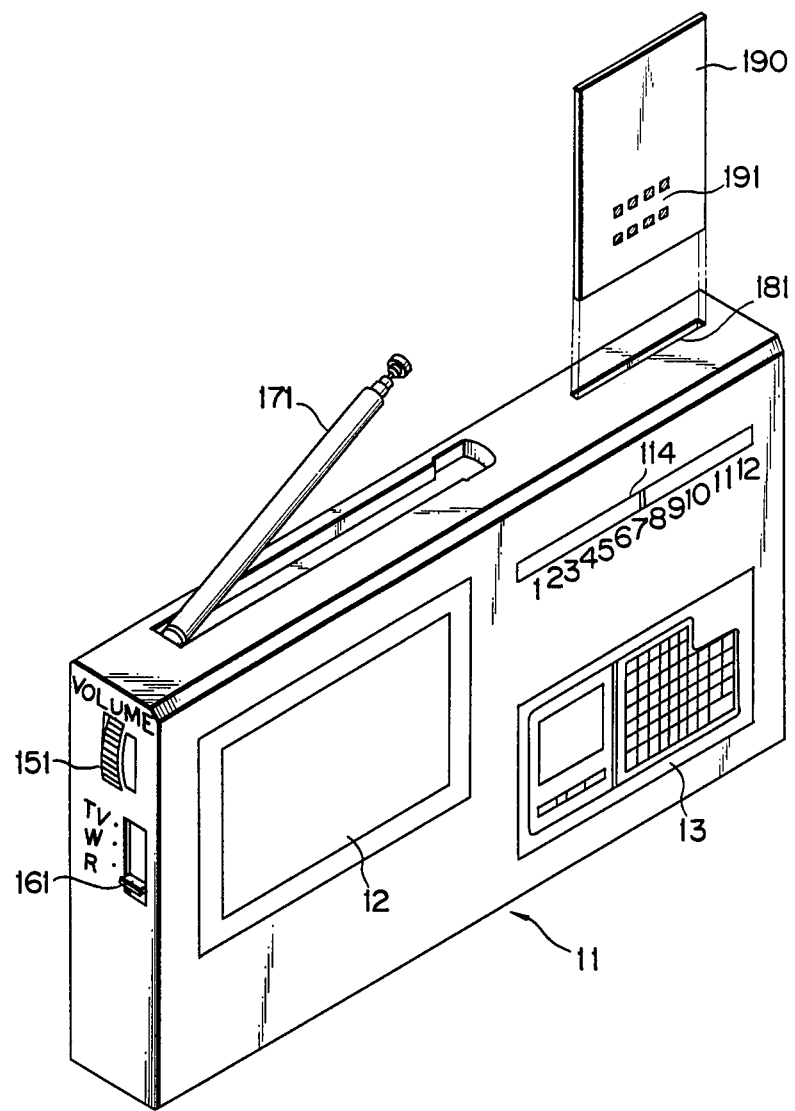
FIG. 11 is a perspective view showing the outer appearance of a compact liquid crystal television receiver having a detachable IC card as an information memory according to another embodiment of the present invention.

Still another embodiment using an IC card as an information memory will be described with reference to FIG. 11. FIG. 11 shows an outer appearance of a compact liquid crystal television receiver having a detachable IC card. Liquid crystal display panel 12 and keyboard 13, and channel display 114 are arranged on the front surface of case 11. Volume switch 151 and selection switch 161 are arranged at the side wall of case 11. Rod antenna 171 and card insertion port 181 are provided at the upper portion of case 11. IC card 190 having connector terminals 191 at specific positions can be inserted into or dispensed from insertion port 181.

Figure 12:
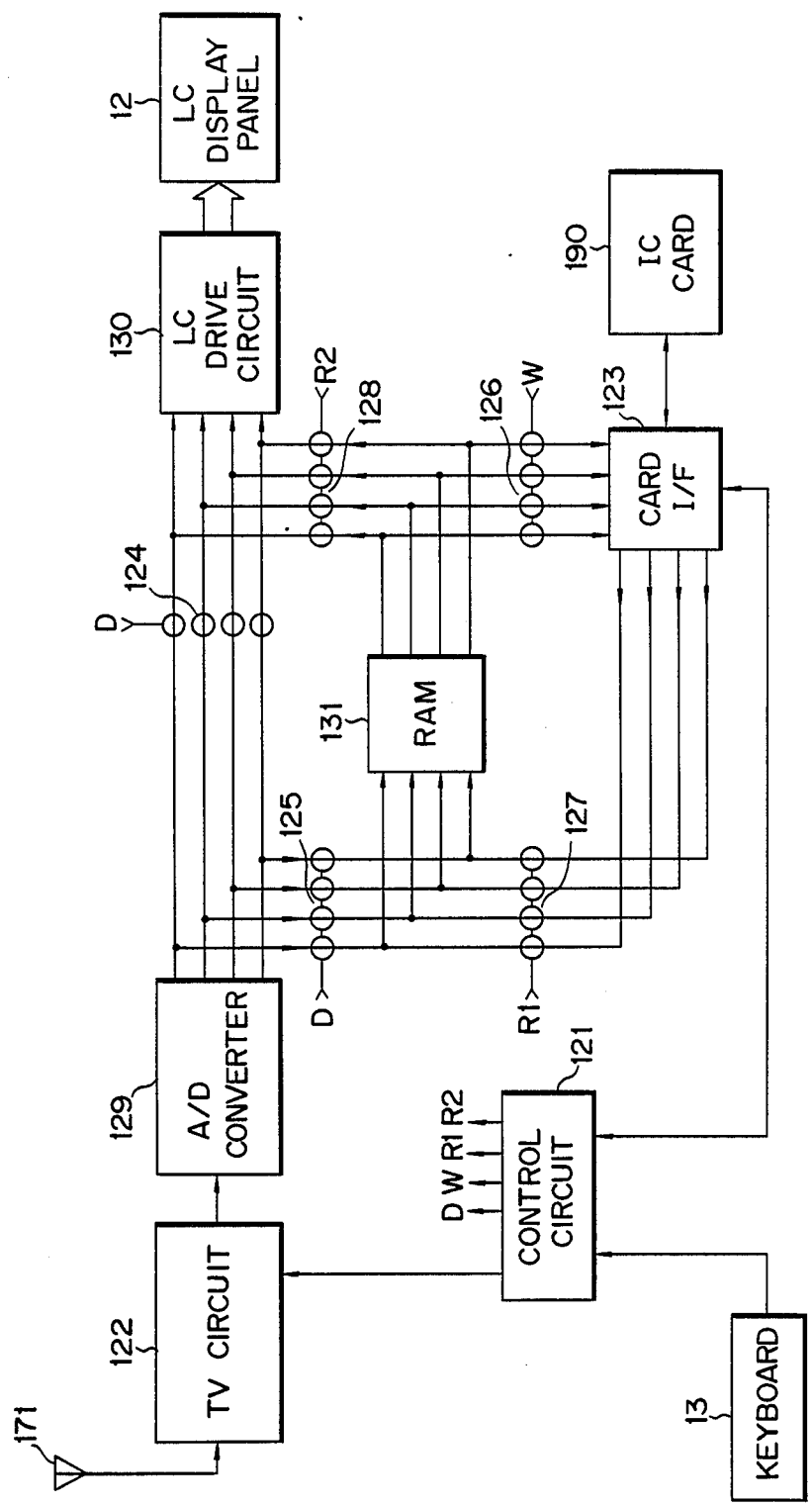
FIG. 12 is a block diagram of an electronic circuit in the embodiment of FIG. 11.

An arrangement of an electronic circuit in case 11 will be described with reference to FIG. 12. Referring to FIG. 12, reference numeral 121 denotes a control circuit. Control circuit 121 controls all components in response to a key input signal from keyboard 13. More specifically, control circuit 121 inputs/outputs data to/from TV circuit 122 and card interface 123, and outputs gate signal D to gate circuits 124 and 125, gate signal W to gate circuit 126, gate signal R1 to gate circuit 127, and gate signal R2 to gate circuit 128. TV circuit 122 processes the signal received from rod antenna 171 according to control data from control circuit 121 and supplies an image signal to A/D converter 129. A/D converter 129 converts an analog image signal supplied from TV circuit 122 into, for example, 4-bit image data. The data is supplied to liquid crystal driver 130 through gate circuit 124 and to RAM 131 through gate circuit 125. One-frame image data is temporarily stored in RAM 131, and the storage contents are supplied to driver 130 through gate circuit 128 or to card interface 123 through gate circuit 126. In accordance with the control data from control circuit 121, interface 123 writes an image signal supplied from RAM 131 in IC card 190 and reads out the image signal therefrom. The readout image signal is supplied to RAM 131. Driver 130 drives liquid crystal display panel 12 according to the image signal supplied from A/D converter 129 through gate circuit 124 and output from TV circuit 122, or to the image signal supplied from card interface 123 to IC card 190 through gate circuit 127, RAM 131, and gate circuit 128 and stored in IC card 190, thereby displaying a television image.

The operation of the embodiment described above will be described below.

Selection switch 161 is set to the "TV" position to set the television receiver in the television mode. Gate signal D supplied from control circuit 121 to gate circuits 124 and 125 is set at logic "1", and other gate signal W, R1, and R2 are set at logic "0". The image signal received by rod antenna 171 and processed by TV circuit 122 is converted into a digital signal by A/D converter 129. The digital signal is supplied to driver 130 through gate circuit 124. At the same time, the digital signal is supplied to RAM 131 through gate circuit 125. Driver 130 drives liquid crystal display panel 12 according to the television image signal sent from A/D converter 129 through gate circuit 124. Meanwhile, the same image signal as that supplied to driver 130 is normally supplied to RAM 131. However, gate signals W and R2 from control circuit 121 are set at logic "0", so that gate circuits 126 and 128 are disabled. No written signal is read out.

If the user wishes to record this image, he changes selection switch 161 from the "TV" position to the "W" position to set the television receiver in the image signal write mode. Upon this switching, gate signal D to gate circuits 124 and 125 and gate signal W to gate circuit 126 go high, and other gate signals R1 and R2 are set at logic "0". Control circuit 121 supplies control data to card interface 123. This control data designates writing of data in IC card 190. The television image signal received by rod antenna 171 and processed by TV circuit 122 is supplied to A/D converter 129. The digital signal from A/D converter 129 is supplied to driver 130 through gate circuit 124 and to RAM 131 through gate circuit 125. Driver 130 drives liquid crystal display panel 12 according to the television image signal supplied to A/D converter 129 through gate circuit 124. Meanwhile, the same signal as supplied to driver 130 is supplied to RAM 131. Since gate signal W from control circuit 121 is set at logic "1", gate circuit 126 is enabled. The image signal written in RAM 131 is read out therefrom and is supplied to card interface 123 through gate circuit 126. Interface 123 supplies to IC card 190 the image signal supplied on the basis of control data from control circuit 121.

The image signal write timing of IC card 190 will be described. RAM 131 constantly updates and stores one-frame image data in response to the vertical sync signal of the television signal (the sync signal system is omitted). Selection switch 161 is set in the "W" position. One-frame data is read out from RAM 131 in response to the vertical sync signal generated upon depression of the write key on keyboard 13. The readout one-frame data is written in IC card 190 through card interface 123.

If the user wishes to display the image signal recorded in IC card 190 on liquid crystal display panel 12, he switches selection switch 161 to the "R" position to set the television receiver in the image read mode. In this state, control circuit 121 supplies gate signal R1 of logic "1" to gate circuit 127 and gate signal R2 of logic "1" to gate circuit 128. Other gate signals D and W are set at logic "0". Control circuit 121 sends out control data to interface 123 so as to read out the image signal from IC card 190. Gate signal D supplied to gate circuits 124 and 125 is set at logic "0", and thus gate circuits 124 and 125 are disabled. The image signal received by rod antenna 17 and processed by TV circuit 122 is converted into digital data by A/D converter 129. However, the digital data is not supplied to driver 130 or RAM 131. Control circuit 121 reads out image data from IC card 190 and supplies image data to RAM 131 through gate circuit 127 enabled in response to gate signal R1 from control circuit 121. RAM 131 temporarily stores the image signal and the storage contents are output to driver 130 through gate circuit 128 enabled in response to gate signal R2 from control circuit 121. Driver 130 drives panel 12 in response to the image signal from RAM 131, and the image stored in IC card 190 is displayed as a still image.

In the above embodiment, circuit 122 comprises a TV circuit to obtain only a normal television image. However, a TV circuit may receive character broadcast data representing still image display of the entire screen, still image display of superimposed characters, and superimposed character display. Character broadcast TV circuit 122 will be briefly described below.

Figure 13:
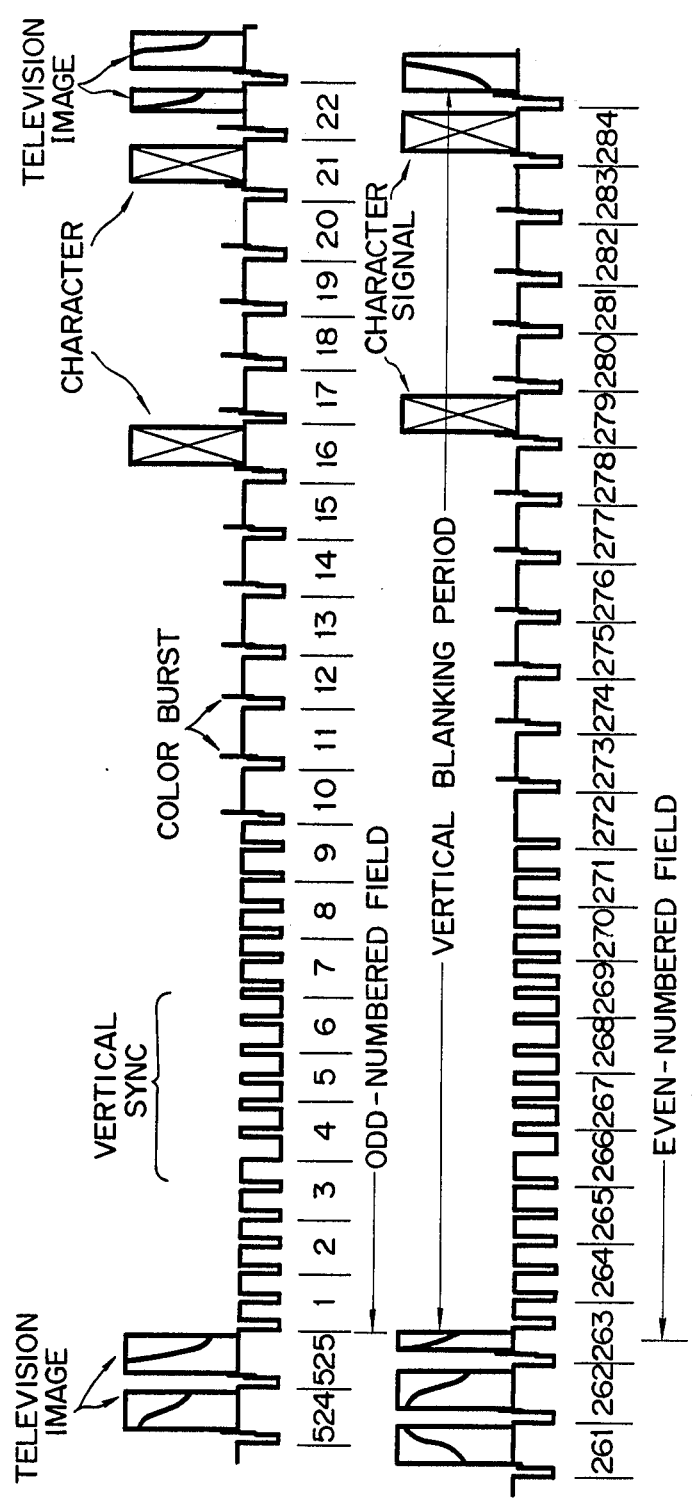
FIG. 13 is a timing chart showing the transmission states of character signals.

Unlike the normal television video signal, a character broadcast signal is sent while being superposed on the television signal during the vertical blanking period (VBL). FIG. 13 shows its VBL consisting of 21 horizontal scanning line periods H. In principle, the period from the 10th H to 21st H of an odd-numbered field and the period from the 273rd H to 284th H of an even-numbered field can be used for multiplex broadcasting. In order not to cause interference to current television receivers, the 16th and 21st H of an odd-numbered field and the 279th and 284th H of an even-numbered field are proposed to be used for multiplex broadcasting.

Figure 14:
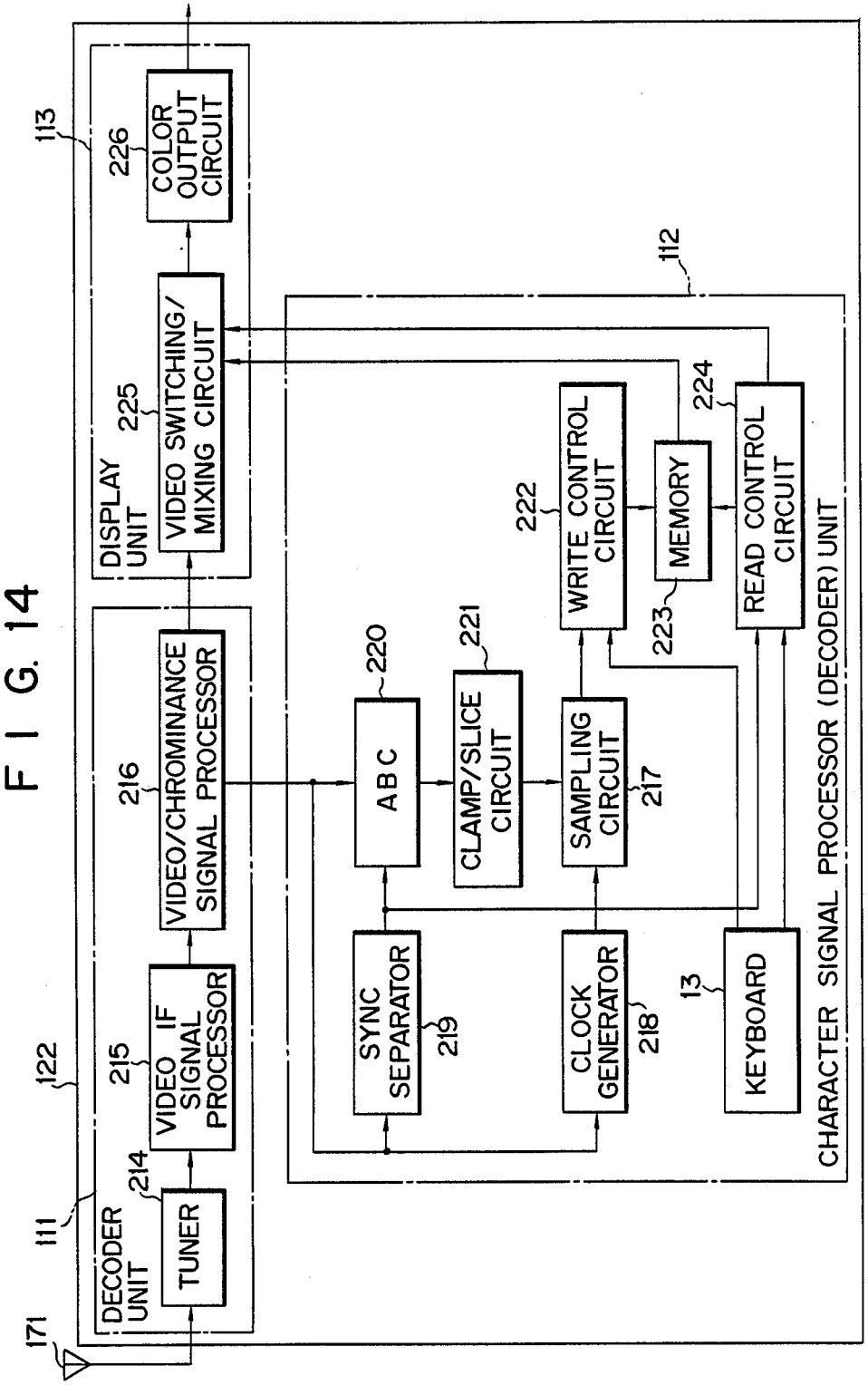
FIG. 14 is a block diagram showing an arrangement of a television circuit for receiving character broadcast.

FIG. 14 shows a circuit arrangement of TV circuit 122 for receiving character broadcast program. TV circuit 122 mainly comprises decoder unit 111, character signal processor (decoder unit) 112, and display unit 113.

Decoder unit 111 comprises tuner 214, video IF signal processor 215, and video/chrominance signal processor 216. The television wave received by rod antenna 171 is decoded to produce a video signal. The video signal is supplied to decoder unit 112 and display unit 113.

Decoder unit 112 comprises keyboard 13, sampling circuit 217, clock generator 218, sync separator 219, ABC circuit 220, clamp slice circuit 221, write control circuit 222, memory 223, and read control circuit 224.

In decoder unit 112, the character signal superposed on the video signal during the vertical blanking period is extracted, a television program signal designated by keyboard 13 is selected, the selected program signal is written in memory 223, the contents of memory 223 are repeatedly read out for every field period (i.e., 1/60 sec), and the character signal is supplied to display unit 113.

Display unit 113 comprises video switching/mixing circuit 225 and color output circuit 226. More specifically, display unit 113 switches between the television program signal and the character program signal, mixes characters in a television program to superimpose the characters on the screen, and supplies the resultant image signal to A/D converter 129 of FIG. 12.

The circuit in FIG. 12 constitutes a black-and-white television receiver. However, in order to constitute a color television receiver, three A/D converters are arranged to A/D-convert R, G, and B signals into digital signals. R, G, and B digital signals are respectively supplied to R, G, and B segments of liquid crystal display panel 12.

The operation of the embodiment described above will be described below.

The outer appearance of the television receiver of this embodiment is substantially the same as that of FIG. 11, and a detailed description thereof will be omitted.

Figure 15:
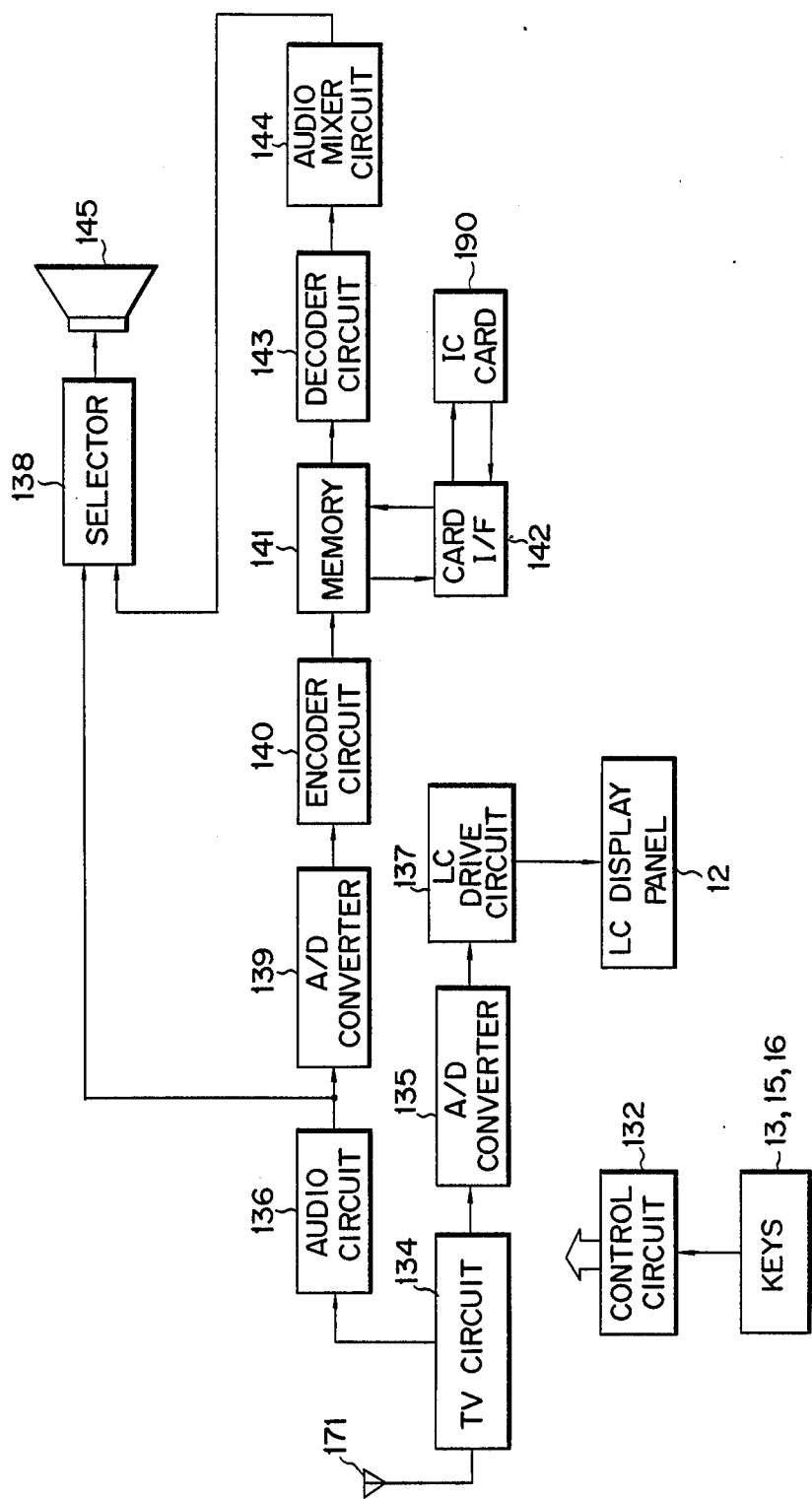
FIG. 15 is a block diagram of an electronic circuit according to still another embodiment of the present invention.

FIG. 15 shows an arrangement of an electronic circuit of the television receiver of this embodiment. Reference numeral 132 denotes a control circuit for controlling the overall operations upon operations of volume switch 151 and selection switch 161. Control data from control circuit 132 is supplied to the respective components. A signal received by rod antenna 171 is input to TV circuit 34. TV circuit 134 processes the input signal to supply an image signal to A/D converter 135 and an audio signal to audio circuit 136. A/D converter 135 converts the input image signal into digital data. The digital data is supplied to liquid crystal driver 137 to cause liquid crystal display panel 12 to display an image. Audio circuit 136 supplies the input audio signal to selector 138 and A/D converter 139. A/D converter 139 converts the analog audio signal into a digital audio signal. The digital audio signal is supplied to encoder 140. Encoder 140 encodes the digital audio signal supplied from A/D converter 139 into a code in a form suitable for storage. The encoded audio signal is supplied to memory 141 and stored therein. Data write-/read access of memory 141 is performed by card interface 142. The audio signal read out from memory 141 is written in IC card 190 by card interface 142. Card interface 142 reads out the audio signal from IC card 190 and the readout signal is written in memory 141. The audio signal written in memory 141 by card interface 142 is then supplied to decoder 143 and decoded thereby. The decoded audio signal is converted into the original analog audio signal by audio signal mixer 144. The analog audio signal is supplied to selector 138. Selector 138 selects the audio signal from audio circuit 136 and the audio signal from audio signal mixer 144 according to control data from control circuit 132, and sounds are produced at loudspeaker 145.

The operation of the above embodiment will be described below.

The user sets selection switch 161 to the "TV" position to set the television receiver in the television reception mode. A signal received by rod antenna 171 is supplied to TV circuit 134. TV circuit 134 processes the input television signal to supply an image signal to A/D converter 135 and an audio signal to audio circuit 136. A/D converter 135 converts the input image signal into a digital image signal. The digital image signal is supplied to liquid crystal driver 137 to cause liquid crystal display panel 12 to display the resultant image. Audio circuit 136 supplies the input audio signal to selector 138 and A/D converter 139. Selector 138 selects the audio signal of the currently broadcasted television program from audio circuit 136. The selected audio signal is supplied to loudspeaker 145, which produces sounds.

If the user wishes to record the sounds, he sets selection switch 16 from the "TV" position to the "W" position to set the television receiver in the audio signal write mode. In this state, control circuit 132 outputs control data to card interface 142. This control data instructs writing of the audio signal in IC card 190. Card interface 142 reads out the encoded audio signal supplied from audio circuit 136 and recorded in memory 141 through A/D converter 139 and encoder 140. The readout signal is supplied to IC card 190 and recorded therein. Meanwhile, selector 138 selects the audio signal from audio circuit 136 according to control data from control circuit 132. Loudspeaker 145 outputs the audio signal of the current broadcast television program. Memory 141 has a capacity of 4 minutes and records data in an endless manner. When the write key on keyboard 13 is operated at the time when switch 161 is set in the "W" position, the 4-minute audio signal stored in memory 141 is recorded in IC card 190 through interface 142. Therefore, the audio signal can be continuously recorded for 4 minutes upon depression of the write key.

In order to output the audio signal recorded in IC card 190 by loudspeaker 145, the user sets selection switch 161 to the "R" position so as to set the television receiver in the audio signal read mode. In this state, control circuit 132 outputs control data to card interface 142. This control data instructs reading of the audio signal from IC card 190. Control circuit 132 also supplies control data to selector 138. This control data is used to select the audio signal output from audio signal mixer 144. Card interface 142 reads out the audio signal from IC card 190 according to the control data from control circuit 132, and the readout data is stored in memory 141. The audio signal stored in memory 141 is decoded by decoder 143. The decoded audio signal is mixed by audio signal mixer 144, and the resultant signal is supplied to selector 138. Selector 138 selects the audio signal from mixer 144 on the basis of control data from control circuit 132. The selected audio signal is output at loudspeaker 145. As a result, loudspeaker 145 outputs the sounds represented by the audio signal stored in IC card 190.

Still another embodiment of the present invention will be described with reference to FIG. 16.

In this embodiment, a color television image is recorded in an IC card. If the memory capacity of one IC card is too small to record a color still image, R, G, and B image signals are respectively recorded in three IC cards.

Figure 16:
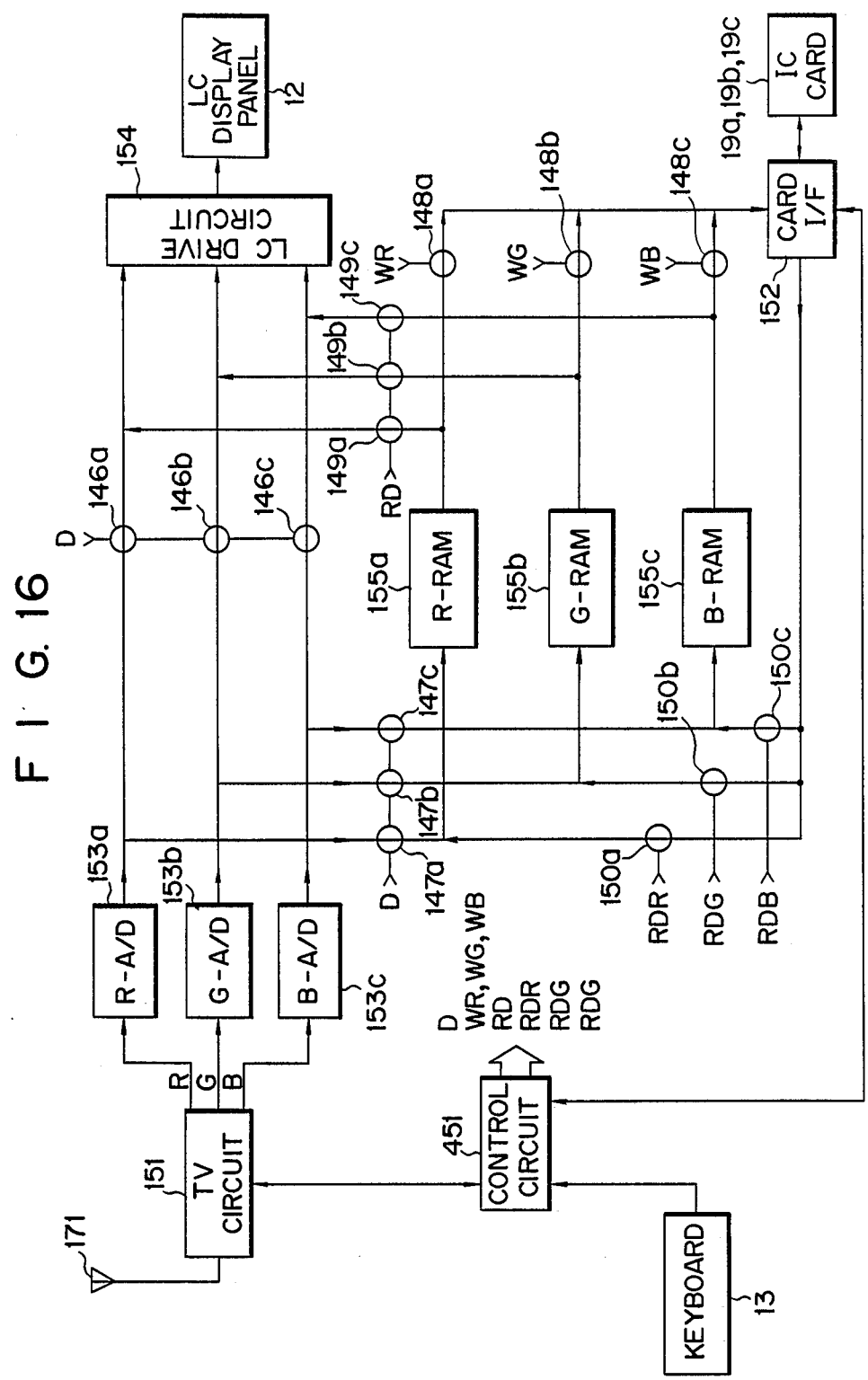
FIG. 16 is a block diagram of an electronic circuit capable of recording and reproducing a color image by using an IC card according to still another embodiment of the present invention.

The outer appearance of this embodiment is substantially the same as that of FIG. 1, and the same reference numerals as in FIG. 1 denote the same parts in FIG. 16, and a detailed description thereof will be omitted.

Figures 17, 18:
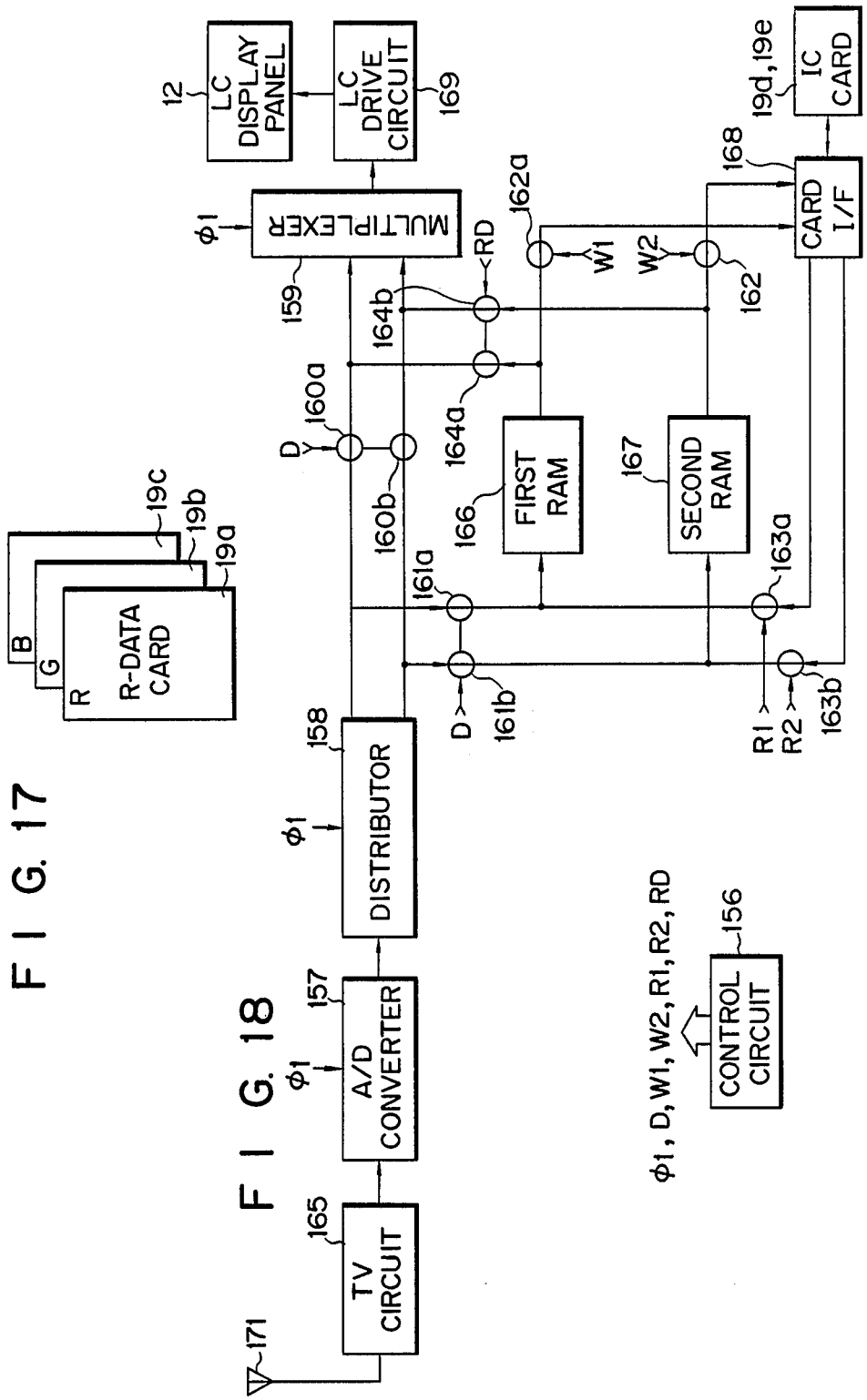
FIG. 17 is a schematic view showing a plurality of IC cards.
FIG. 18 is a block diagram showing an arrangement of an electronic circuit according to still another embodiment of the present invention.

FIG. 16 shows an arrangement of an electronic circuit in case 11. Referring to FIG. 16, reference numeral 451 denotes a control circuit for controlling the respective components in response to a key input signal from keyboard 13. Control circuit 451 supplies gate signal D to gate circuits 146a to 146c and 147a to 147c, gate signals WR, WG, and WB to gate circuits 148a to 148c, gate signal RD to gate circuits 149a to 149c, and gate signals RDR, RDG, and RDB to gate circuits 150a to 150c. Control circuit 451 also exchanges data with TV circuit 151 and card interface 152. TV circuit 151 processes a television signal received by rod antenna 171 and supplies a red (R) signal of the RGB color image signal to R-A/D converter 153a, a green (G) signal thereof to G-A/D converter 153b, and blue (B) signal thereof to B-A/D converter 153c. Converters 153a, 153b, and 153c convert input digital signals to digital image signals, respectively. An output from converter 153a is supplied to liquid crystal driver 154 through gate circuit 146a and stored in R-RAM 155a through gate circuit 147a. An output from converter 153b is supplied to driver 154 through gate circuit 146b and stored in G-RAM 155b through gate circuit 147b. An output from converter 153c is supplied to driver 154 through gate circuit 147c and stored in B-RAM 155c through gate circuit 147c. The image signals stored in R- to B-RAMs 155a to 155c are supplied to card interface 152 through gate circuits 148a to 148c and to driver 154 through gate circuits 149a to 149c. Interface 152 writes the image signals supplied from R-, G-, and B-RAMs 155a, 155b, and 155c in IC cards 19a, 19b, and 19c according to control data from control circuit 451. Interface 152 reads out the image signals from cards 19a, 19b, and 19c and send them to R-, G-, and B-RAMs 155a, 155b, and 155c through gate circuits 150a to 150c, respectively. In this case, IC cards 19 consist of three IC cards 19a to 19c, as shown in FIG. 17. Card 19a stores the R signal of the RGB color image signal, card 19b stores the G signal, and card 19c stores the B signal. Data write access of each IC card is performed such that each card is inserted in and dispensed from card insertion port 18 (FIG. 1) repeatedly. Driver 154 drives liquid crystal display panel 12 on the basis of the image signals sent from converters 153a, 153b, and 153c through gate circuits 146a to 146c and the image signals supplied from R-, G-, and B-RAMs 155a, 155b, and 155c through gate circuits 149a to 149c, thereby displaying a color image.

The operation of the embodiment described above will be described below.

The user changes selection switch 161 to the "TV" position to set the television receiver in the television mode. In this state, control circuit 451 supplies gate signal D of logic "1" to gate circuits 146a to 146c and 147a to 147c. Other gate signals WR, WG, WB, RD, RDR, RDG, and RDB are set at logic "0". R, G and B signals constituting the color image signal output from TV circuit 151 are respectively converted by R-, G- and B-A/D converters 153a, 153b, and 153c. The digital signals from converters 153a, 153b, and 153c are supplied to liquid crystal driver 154 through gate circuits 146a to 146c and to R-, G-, and B-RAMs 155a, 155b, and 155c through gate circuits 147a to 147c. Driver 154 drives liquid crystal display panel 12 on the basis of the color image signal sent thereto, and thus a color image is displayed on panel 12. R-, G-, and B-RAMs 155a, 155b, and 155c store image signals supplied from converters 153a, 153b, and 153c through gate circuits 147a to 147c, respectively. The storage contents are not read out since gate circuits 148a to 148c and 149a to 149c are disabled in response to gate signal WR, WG, WB, and RD.

Selection switch 161 is switched to the "W" position to set the television receiver in the color image write mode. In this state, control circuit 451 supplies gate signal D of logic "1" to gate circuits 146a to 146c and 147a to 147c. Gate signals WR, WG, and WB supplied to gate circuits 148a to 148c are sequentially set at logic "1" on the basis of the data from card interface 152. Other gate signals RD, RDR, RDG, and RDB are set at logic "0". Control circuit 451 supplies control data to interface 152. This control data instructs writing of color image signal components in IC cards 19a, 19b, and 19c. The color image signal components, i.e., the R, G, and B signals from TV circuit 151 are respectively converted into digital signals by R-, G-, and B-A/D converters 153a, 153b, and 153c. The digital signals are supplied to liquid crystal driver 154 through gate circuits 146a to 146c and to R-, G-, and B-RAMs 155a, 155b, and 155c through gate circuits 147a to 147c. Driver 154 drives liquid crystal display panel 12 in response to the color image signal input thereto, thereby displaying a color image. R-, G-, and B-RAMs 155a, 155b, and 155c store the image signals supplied from converters 153a, 153b, and 153c through gate circuits 147a to 147c. In this state, gate signal WR supplied from control circuit 451 to gate circuit 148a is first set at logic "1". The R signal is read out from R-RAM 155a and supplied to interface 152. IC card 19a is inserted in card insertion port 18 and the user depresses the "R" write key on keyboard 13. Then, the R signal supplied to interface 152 in response to control data from control circuit 451 is written and stored in IC card 19a. When write access is completed, the user dispenses IC card 19a and inserts IC card 19b instead. When the user depresses the "G" write key on keyboard 13, data is sent from interface 152 to control circuit 451. Gate signal WR sent to gate circuit 148a is set at logic "0" by control circuit 451. Instead, control circuit 451 supplies gate signal WG of logic "1" to gate circuit 148b. The G signal stored in G-RAM 155b is supplied to interface 152. Interface 152 writes in IC card 19b the G signal supplied in response to the control data from control circuit 451. When write access is completed, card 19b is dispensed and card 19c is inserted instead. In this state, when the user depresses the "B" write key, data is sent from interface 152 to control circuit 451 again. Gate signal WG supplied to gate circuit 148b is set to be logic "0" by control circuit 451. Gate signal WB to be supplied to gate circuit 148c is set to be logic "1" by control circuit 451. The B signal is read out from B-RAM 155c and sent to interface 152. The B signal sent in response to the control data from control circuit 451 is written in IC card 19c by card interface 152. The color image signal write access cycle of all IC cards 19a to 19c is completed.

When the user switches selection switch 161 to the "R" position to set the television receiver in the mode for reading out the color image components stored in IC cards 19a to 19c, gate signal D input to gate circuits 146a to 146c and 147a to 147c and gate signals WR, WG, and WB input to gate circuits 148a to 148c are set at logic "0". Gate signals RDR, RDG, and RDB input to gate circuits 150a to 150c are sequentially set at logic "1" in response to data from interface 152. Gate signal RD input to gate circuits 149a to 149c goes high after rising of the above-mentioned signals. The color image signal components, i.e., the R, G, and B signals output from TV circuit 151 are converted into digital signals by R-, G-, and B-A/D converters 153a, 153b, and 153c. However, since gate signal D from control circuit 451 is set at logic "0", gate circuits 146a to 146c and 147a to 147c are disabled and the digital signals are not output. Card interface 152 reads out the R signal from IC card 19a which is first inserted in the card insertion port, upon operation of the "R" read key on keyboard 13, in response to control data from control circuit 451. At this time, only gate signal RDR input from control circuit 451 to gate circuit 150a is set at logic "1" in gate circuits 150a to 150c. The R signal in IC card 19a, output from interface 152, is sent to R-RAM 155a through gate circuit 150a and stored therein. Read operation of the storage contents of card 19a is completed and the user inserts card 19b instead of card 19a through card insertion port 18. When the user then depresses the "G" read key, data is sent from interface 152 to control circuit 451. Gate signal RDR input to gate circuit 150a is set to be logic "0" by control circuit 451. Instead, gate signal RDG input to gate circuit 50b is set to be logic "1" by control circuit 451. At the same time, control circuit 451 outputs control data to card interface 152. This control data instructs read operation of the storage contents of card 19b. Interface 152 reads out the G signal from card 19b in response to the control data. The readout G signal is sent to G-RAM 155b through gate circuit 150b and stored therein. Read operation of the contents of card 19b is completed and the user inserts card 19c instead of 19b through card insertion port 18. In this state, when the user depresses the "B" read key, data is sent from interface 152 to control circuit 451. Gate signal RDG input to gate circuit 150b is set to be logic "0" by control circuit 451. Instead, gate signal RDB input to gate circuit 150c is set to be logic "1" by control circuit 451. At the same time, control circuit 451 outputs control data to interface 152. This control data instructs read operation of the storage contents of card 19c. Interface 152 reads out the B signal from IC card 19b. The readout B signal is sent to G-RAM 155c through gate circuit 150c and stored therein. When the R, G, and B signals read out from cards 19a, 19b, and 19c stored in R-, G-, and B-RAMs 155a, 155b, and 155c, respectively, and the user depresses the "display" key on keyboard 13, gate signal RD supplied from control circuit 451 to gate circuits 149a to 149c goes high, so that the contents of R-, G-, and B-RAMs 155a, 155b, and 155c are sent to liquid crystal driver 154 through gate circuits 149a to 149c. Driver 154 drives liquid crystal display panel 12 on the basis of the R, G, and B signals sent from R-, G-, and B-RAMs 155a, 155b, and 155c to display a color image.

In the above embodiment, in order to read out the R, G, and B signals from IC cards 19a, 19b, and 19c, the "R", "G", and "B" read keys are depressed. However, when an IC card is set, a flag prestored at the time of write access thereof may be detected to automatically identify the R, G, or B signal and to load the readout image data to the corresponding one of memories 155a, 155b, and 155c.

In the above embodiment, TV circuit 151 comprises a circuit for producing a normal television image. However, circuit 151 may be a character broadcast TV circuit for displaying a still image on the entire screen, a superimposed still image or superimposed characters. Character broadcast TV circuit 151 has substantially the same arrangement as that of FIG. 14, and a detailed description thereof will be omitted. In this case, the R, G, and B signals are output from color output circuit 226 in display unit 113.

Still another embodiment of the present invention will be described with reference to FIG. 18.

In this embodiment, in the case wherein the storage capacity of an IC card is limited, an image signal is stored in a plurality of IC cards. For example, if the number of display pixels of a liquid crystal panel along the horizontal direction is N, data of N/2 odd-numbered dots is stored in the first IC card and data of N/2 even-numbered dots is stored in the second IC card. A coarse image can be stored in a single IC card, and an image of a high resolution can be stored in two IC cards.

The outer appearance of the television receiver of this embodiment is substantially the same as that of FIG. 1. The same reference numerals as in FIG. 1 denote the same parts in FIG. 18, and a detailed description thereof will be omitted.

FIG. 18 shows an arrangement of an electronic circuit in case 11 of the television receiver of the embodiment in FIG. 18. Reference numeral 156 denotes a control circuit for controlling the operations of the components in response to a key input signal from keyboard 13. Control circuit 156 sends sampling clock $\phi 1$ to A/D converter 157, distributor 158, and multiplexer 159. Clock $\phi 1$ has a frequency corresponding to N clocks per scanning line. Control circuit 156 also supplies gate signal D to gate circuits 160a, 160b, 161a, and 161b, gate signal W1 to gate circuit 162a, gate signal W2 to gate circuit 162b, gate signal R1 to gate circuit 163a, gate signal R2 to gate circuit 163b, and gate signal RD to gate circuits 164a and 164b. When a television signal is received by rod antenna 171, the received signal is sent to TV circuit 165. TV circuit 165 processes the input signal and sends a television image signal to A/D converter 157. Converter 157 samples the signal in response to sampling clock $\phi 1$ from control circuit 156 to produce a digital image signal. The digital image signal is sent to distributor 158. Distributor 158 distributes the image signal from converter 157 into a plurality of components, e.g., two components in response to clock $\phi 1$ from control circuit 156. The image signal from distributor 158 is supplied to multiplexer 159 through gate circuits 160a and 160b and to first and second RAMs 166 and 167 through gate circuits 161a and 161b. RAMs 166 and 167 store the input image signals and supply the storage contents to card interface 168 through gate circuits 162a and 162b and to multiplexer 159 through gate circuits 164a and 164b. Interface 168 writes the image signal supplied through gate circuits 162a and 162b in IC cards 19d and 19e and sends the image signals read out therefrom to RAMs 166 and 167 through gate circuits 163a and 163b. In this case, two IC cards 19d and 19e are used. Cards 19d and 19e store the image signals distributed by distributor 158 and stored in RAMs 166 and 167. By repeating insertion and dispensing of each card through card insertion port 18, data access cycles are sequentially performed. Multiplexer 159 superposes the image signal supplied from distributor 158 through gate circuits 160a and 160b or the image signal supplied from RAMs 166 and 167 through gate circuits 164a and 164b in response to clock $\phi1$ from control circuit 156, and supplies the superposed signal to liquid crystal driver 169 in the same state as that of the output from A/D converter 157. Driver 169 drives liquid crystal display panel 12 on the basis of the image signal supplied from multiplexer 159, thereby displaying the image.

The operation of the above embodiment having the arrangement described above will be described below.

In the television mode wherein selection switch 16 is set in the "TV" position, control circuit 156 supplies gate signal D of logic "1" to gate circuits 160a, 160b, 161a, and 161b. Other gate signals W1, W2, R1, R2, and RD are set at logic "0". In this case, the image signal from TV circuit 165 is converted into a digital signal by A/D converter 157. The digital signal is divided into two components by distributor 158 in response to sampling clock $\phi1$. The odd-numbered component is supplied to gate circuits 160a and 161a, and the even-numbered component is supplied to gate circuits 160b and 161b. Since gate circuits 160a, 160b, 161a, and 161b are enabled in response to gate signal D, the outputs from distributor 158 are sent to multiplexer 159 and RAMs 166 and 167. Multiplexer 159 superposes the two image signals input in response to distribution of distributor 158. The superposed image signal is sent to driver 169. Driver 169 drives panel 12 according to the image signal from multiplexer 159, thereby displaying a television image on panel 12. The image signal sent to RAMs 166 and 167 and stored therein is not read out since gate circuits 162a, 162b, 164a, and 164b are disabled in response to gate signals W1, W2, and RD.

When the user switches selection switch 16 to the "W" position to set the television receiver in the television image write mode, gate signal D supplied from control circuit 156 to gate circuits 160a, 160b, 161a, and 161b is set at logic "1", and gate signals W1 and W2 input to gate circuits 162a and 162b are sequentially set at logic "1" in response to data from card interface 168. Gate signals R1 and R2 input to gate circuits 163a and 163b and gate signal RD input to gate circuits 164a and 164b are set at logic "0". At the same time, control circuit 156 sends control data to interface 168. This control data instructs writing of the television image in IC cards 19d and 19e. The television image signal output from TV circuit 165 is converted into a digital signal by A/D converter 157 and the digital signal is divided into odd- and even-numbered components by distributor 158 in response to sampling clock $\phi1$. Since gate circuits 160a, 160b, 161a, and 161b are enabled in response to gate signal D, the outputs from distributor 158 are supplied to multiplexer 159 and the RAMs 166 and 167 through gate circuits 160a, 160b, 161a, and 161b. Multiplexer 159 superposes the two image signals input in response to distribution of distributor 158 in response to clock $\phi1$, and the superposed signal is sent to driver 169. Driver 169 drives panel 12 according to the image signal from multiplexer 159 to display a television image. RAMs 166 and 167 store the image signals supplied from distributor 158 through gate circuits 161a and 161b. Therefore, RAM 166 stores the odd-numbered image signal, and RAM 167 stores the even-numbered image signal. When the user inserts card 19d in card insertion port 181 and depresses the "first write key" (not shown) in keyboard 13, gate signal W1 from control circuit 156 is set at logic "1" to enable gate circuits 162a. The image data is read out from RAM 166 and supplied to interface 168. Interface 168 writes the image signal read out from RAM 166 in card 19d in response to control data from control circuit 156. When data write access is completed, the user dispenses card 19d and inserts card 19e in port 181 instead. In this state, when the user depresses the "second write key" (not shown), gate signal W1 supplied from control circuit 156 to gate circuit 162a is set at logic "0", and gate signal W2 supplied to gate circuit 162b is set at logic "1". The image signal is then read out from RAM 167 and sent to interface 168 through gate circuit 162b. Interface 168 writes the image signal in IC card 19e in response to control data from control circuit 156. The image signals are thus completely written in cards 19d and 19e.

When the user switches selection switch 16 to the "R" position to read out the image signals from IC cards 19d and 19e, gate signal D supplied from control circuit 156 to gate circuits 160a, 160b, 161a, and 161b and gate signals supplied to gate circuits 162a and 162b are set at logic "0", gate signals R1 and R2 supplied to gate circuits 163a and 163b are sequentially set at logic "1" in response to the control data from card interface 168, and gate signal RD supplied to gate circuits 164a and 164b is set at logic "1". At the same time, control circuit 156 sends control data to card interface 168. This control data instructs read operation of the television signals from cards 19. The television image signal output from TV circuit 165 is converted into a digital signal by A/D converter 157. The digital signal is divided by distributor 158 into two components in response to sampling clock $\phi1$. Since gate signal D from control circuit 156 is set at logic "0", gate circuits 161a and 161b are disabled, and the components from distributor 158 are supplied nowhere. When the user inserts card 19d and depresses the "first read key" in keyboard 13, the image signal is supplied from card 19d to interface 168 in response to control data from control circuit 156. In this case, gate signal R1 supplied to gate circuit 163a is set at logic "1", and gate signal R2 supplied to gate circuit 163b is set at logic "0". The image signal read out from card 19d by interface 168 is sent to RAM 166 through gate circuit 163a and stored therein. When the storage contents of card 19d are completely read out, the user dispenses card 19d and then inserts card 19e in card insertion port 18. In this state, when the user depresses the "second read key" (not shown), data is sent from interface 168 to control circuit 156. In response to this data, gate signal supplied to gate circuit 163a is set at logic "0", and gate signal R2 supplied to gate circuit 163b is set at logic "1". At the same time, control circuit 156 sends control data to interface 168. This control data instructs read operation of the storage contents of card 19e. When interface 168 reads out the image signal from card 19e, the image signal is sent to RAM 167 through gate circuit 163b and stored therein. The image signals stored in RAMs 166 and 167 are sent to multiplexer 159 through gate circuits 164a and 164b since gate signal RD supplied to gate circuits 164a and 164b is set at logic "1". In response to sampling clock $\phi 1$, multiplexer 159 superposes the two image signals supplied from RAMs 166 and 167. The superposed signal is sent to liquid crystal driver 169. Driver 169 drives liquid crystal display panel 12 in response to the image signal from multiplexer 159 to display the image, signals of which are read out from cards 19d and 19e.

The image signal is divided into two components and these components are stored in two IC cards 19d and 19e. The components are superposed to reproduce the original image on the screen. However, it is sufficient to reproduce the storage contents of one of cards 19d and 19e although a resolution is degraded. The image signals stored in cards 19d and 19e are reproduced and displayed on the screen to obtain an image of a higher resolution. In the above embodiment, TV circuit 165 comprises a circuit for producing a normal television image. However, circuit 165 may be a character broadcast TV circuit for displaying a still image on the entire screen, a superimposed still image or superimposed characters. Character broadcast TV circuit 165 has substantially the same arrangement as TV circuit 122 of FIG. 14, and a detailed description thereof will be omitted.

Still another embodiment of the present invention will be described below.

In this embodiment, if the memory capacity of the IC card is not large and gray scale data of A bits is assigned to each display dot, the A bits are divided into a plurality of bit groups. The bit groups are respectively stored in IC cards. In this case, even if the bit data from one card can be read out to allow recording an image of poor contrast. However, if data is read out from two cards, an image having a high contrast can be recorded.

The outer appearance of the television receiver in this embodiment is the same as that in FIG. 11. The same reference numerals as in FIG. 11 denote the same parts in FIG. 19, and a detailed description thereof will be omitted.

Figure 19:
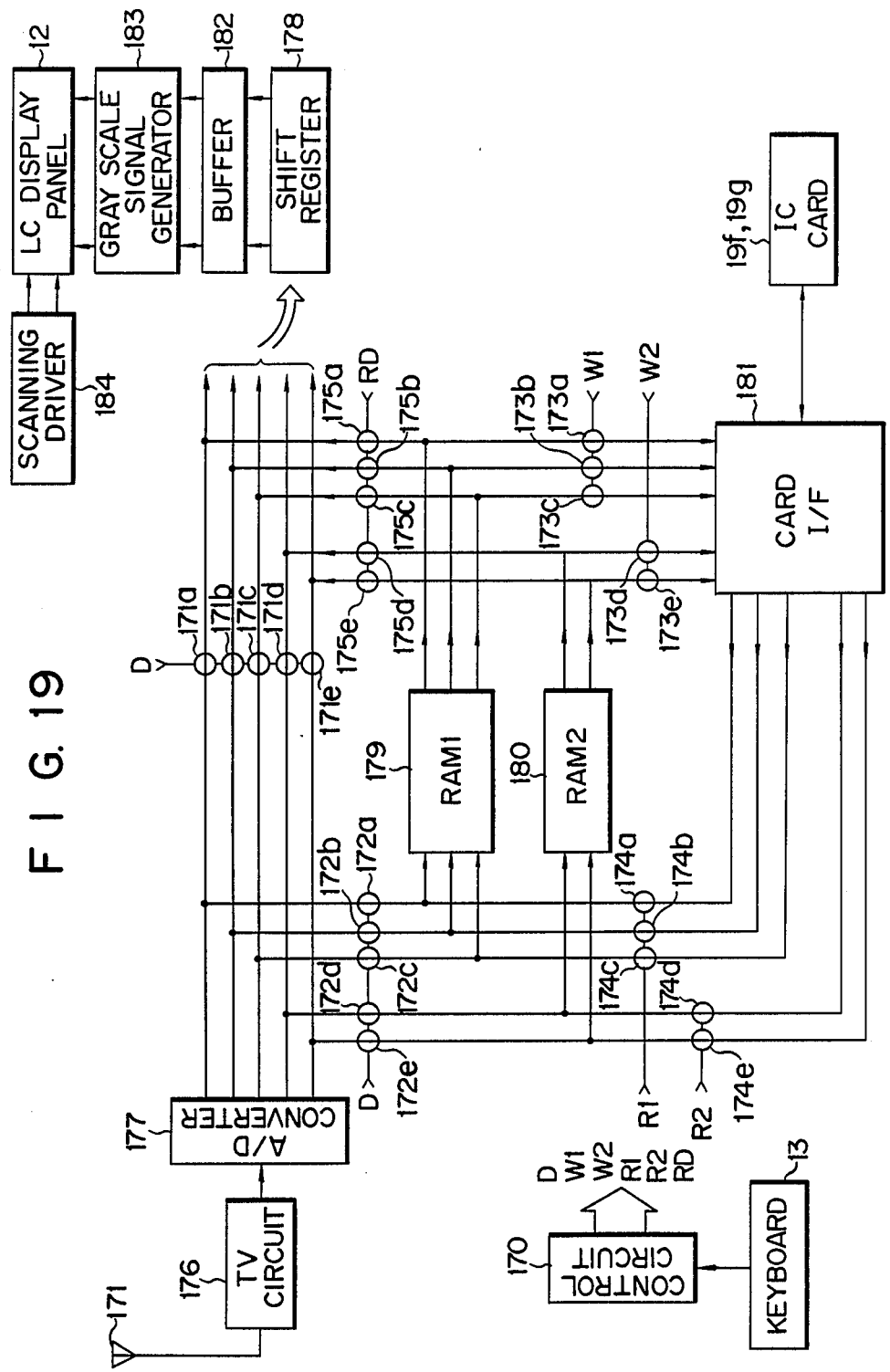
FIG. 19 is a block diagram showing an arrangement of an electronic circuit according to still another embodiment of the present invention.

FIG. 19 shows an arrangement of an electronic circuit in case 11. Referring to FIG. 19, reference numeral 170 denotes a control circuit for controlling the respective components in response to a key input signal from keyboard 13. Control circuit 170 supplies gate signal D to gate circuits 171a to 171e and 172a to 172e, gate signal W1 to gate circuits 173a to 173c, gate signal W2 to gate circuits 173d and 173e, gate signal R1 to gate circuits 174a to 174c, gate signal R2 to gate circuits 174d and 174e, and gate signal RD to gate circuits 175 to 175e. When rod antenna 171 receives a television wave, the received signal is sent to TV circuit 176. TV circuit 176 processes the input signal and supplies the resultant television signal such as an image signal to A/D converter 177. A/D converter 177 converts the input signal into a digital image signal. The digital image signal comprises parallel gray scale data, e.g., 5-bit data in the order of display dots. An output from A/D converter 177 is supplied to shift register 178 through gate circuits 171a to 171e and to first and second RAMs 179 and 180 through gate circuits 172a to 172c, 172d, and 172e.

RAMs 179 and 180 respectively store the upper 3-bit data and the lower 2-bit data of the image signal. The storage contents are sent to card interface 181 through gate circuits 173a to 173c, 173d, and 173e and to shift register 178 through gate circuits 175a to 175e. Interface 181 causes IC cards 19f and 19g to store the image signal sent through gate circuits 173a to 173c, 173d, and 173e in response to the control data from TV circuit 176. Interface 181 sends through gate circuits 174a to 174c, 174d, and 174e the image signal read out from IC cards 19f and 19g. In this case, two IC cards 19f and 19g are used. Cards 19f and 19g store the image signals read out from RAMs 179 and 180, respectively. By repeating insertion/dispensing of each card through card insertion port 181, the corresponding image signal is stored in each card. Register 178 sequentially stores the 5-bit image signal of each dot sent from A/D converter 177 through gate circuits 171a to 171e or from RAMs 179 and 180 through gate circuits 175a to 175e. When the register 178 stores data of one horizontal line, the storage contents thereof are sent to buffer register 182. After the image signal from shift register 178 is stored by buffer register 182, it sends the image signal to gray scale signal generator 183. Generator 183 generates a gray scale signal of each display dot from the image signal of 5-bit data per dot. The resultant gray scale signal is sent to liquid crystal display panel 12. A drive signal is supplied from scanning driver 184 to panel 12, and the drive signal and the gray scale signal constitute an image.

The operation of the embodiment described above will be described below.

In the television mode wherein selection switch 16 is set in the "TV" position, gate signal D supplied from TV circuit 176 to gate circuits 171a to 171e and 172a to 172e is set at logic "1", and other gate signals W1, W2, R1, R2, and RD are set at level "0". In this case, the image signal obtained by TV circuit 176 is converted into A/D converter 177, and 5-bit parallel gray scale data per display dot is output. Since gate circuits 171a to 171e and 172a to 172e are enabled in response to gate signal D, the output from A/D converter 177 is sent to first and second RAMs 179 and 180 through these gate circuits 172a to 172e. Register 178 sequentially shifts and stores the serial signal, and the storage contents are sent to buffer register 182. After the image signal from register 178 is stored by register 182, it sends an output to gray scale signal generator 183. Generator 183 generates a gray scale signal corresponding to each display dot from the image signal of 5-bit data per display dot. The gray scale signal is supplied to liquid crystal display panel 12. Panel 12 displays the television signal by using the drive signal supplied from scanning driver 184 and a drive signal from gray scale generator 183. The image signal sent to and stored by RAMs 179 and 180 is not read out anywhere since gate circuits 173a to 173c, 173d, and 173e and gate circuits 175a to 175e are disabled in response to gate signals W1, W2, and RD.

When the user switches selection switch 16 to the "W" position to set the television receiver in the television image write mode, gate signal D supplied from control circuit 170 to gate circuits 171a to 171e and 172a to 172e is set at logic "1", and gate signals W1 and W2 supplied to gate circuits 173a to 173c, 173d, and 173e are sequentially set at logic "1" according to data from card interface 181. Gate signals R1 and R2 supplied to gate circuits 174a to 174c, 174d, and 174e and gate signal RD supplied to gate circuits 175a to 175e are set at logic "0".

At the same time, control circuit 170 sends control data to interface 181. This control data instructs writing of the television signal in IC cards 19f and 19g. The television image signal output from TV circuit 176 is converted into a digital signal by A/D converter 177. The digital signal is parallel gray scale data of 5 bits per display dot. Since gate circuits 171a to 171e and 172a to 172e are enabled in response to gate signal D, the output from converter 177 is sent to shift register 178 and RAMs 179 and 180. Shift register 178 sequentially shifts and stores the input serial signal, and the storage contents and then sent to buffer register 182. After the image signal from register 178 is stored, register 182 sends it to gray scale signal generator 183. Generator 183 generates a gray scale signal corresponding to each display dot from the image signal of 5-bit data per display dot. The gray scale signal is sent to liquid crystal display panel 12. Panel 12 displays the television image by using the drive signal from scanning driver 184 and the gray scale signal from generator 183. First RAM 179 stores the image signal of upper three bits sent from converter 177 through gate circuits 172a to 172c, and second RAM 180 stores the image signal of lower two bits sent from converter 177 through gate circuits 172d and 172e. Since gate signal W1 from TV circuit 176 is set at logic "1", gate circuits 173a to 173c are enabled, so that the image data is read out from RAM 179 and sent to interface 181. When the user inserts IC card 19f into card insertion port 181 and depresses the "first write key" (not shown) in keyboard 13, interface 181 writes the image signal read out from RAM 179 in card 19f in response to control data from control circuit 170. When write operation is completed, the user dispenses card 19f and inserts card 19g instead. In this state, when the user depresses the "second write key" (not shown), interface 181 sends data to control circuit 170. In response to this data, gate signal W1 supplied from control circuit 170 to gate circuits 173a to 173c is set at logic "0", and gate signal W2 supplied to gate circuits 173d and 173e is set at logic "1". In this case, the image signal is read out from second RAM 180 and sent to interface 181 through gate circuits 173d and 173e. Interface 181 writes the image signal in card 19g in response to the control data from control circuit 170. In this manner, the image signals are completely written in cards 19f and 19g.

When the user switches selection switch 16 to the "R" position to set the mode for reading out the image signals from IC cards 19f and 19g, gate signal D supplied from control circuit 170 to gate circuits 171a to 171e and 172a to 172e and gate signals W1 and W2 supplied to gate circuits 173a to 173c, 173d, and 173e are set at logic "0", and gate signals R1 and R2 supplied to gate circuits 174a to 174c, 174d, and 174e are sequentially set at logic "1" in response to the data from card interface 181. Gate signal RD supplied to gate circuits 175a to 175e is set at logic "1". At the same time, control circuit 170 sends control data to interface 181. This control data instructs reading of the television image signal from IC cards 19f and 19g. The television image signal from TV circuit 176 is converted into a digital signal by A/D converter 177. Since gate signal D from control circuit 170 is set at logic "0", both gate circuits 171a to 171e and gate circuits 172a to 172e are disabled. As a result, the digital signal is sent nowhere. Interface 181 reads out the image signal from card 19f in response to the control data from control circuit 170 upon depression of the "first read key" (not shown) in keyboard 13 and receives the readout signal. Gate signal R1 supplied to gate circuits 174a to 174c is set at logic "1", and gate signal R2 supplied to gate circuits 174d and 174e is set at logic "0". The image signal read out from card 19f by interface 181 is sent to RAM 179 through gate circuits 174a to 174c and stored therein.

The read access of the storage contents of IC card 19f is completed. The user dispenses card 19f and inserts card 19g through card insertion port 181 instead. In this state, when the user depresses the "second read key" (not shown), data is sent from interface 181 to control circuit 170. Gate signal R1 supplied from control circuit 170 to gate circuits 174a to 174c is set at logic "0", and gate signal R2 supplied to gate circuits 174d and 174e is set at logic "1". At the same time, control circuit 170 sends control data to interface 181. This control data instructs reading of the storage contents of IC card 19g. The image signal from card 19g is sent to RAM 180 through gate circuits 174d and 174e and stored therein. Since gate signal RD supplied to gate circuits 175a to 175e is set at logic "1", the image signals stored in RAMs 179 and 180 are combined as 5-bit data through gate circuits 175 to 175e. The composite data is sent to shift register 178. Register 178 sequentially shifts and stores the input signals and then sends the storage contents to buffer register 182. After the image signal from register 178 is stored by resiger 182, it sends the storage contents to gray scale signal generator 183. Generator 183 generates a gray scale signal corresponding to each display dot from the image signal of 5-bit data per dot, and sends the gray scale signal to liquid crystal display panel 12. Panel 12 displays an image, the data of which is stored in cards 19f and 19g, on the basis of the drive signal from scanning driver 184 and the gray scale signal from generator 183.

In the above embodiment, the image signal is divided into a plurality of gray scale signals per display dot, and these signals are stored in two IC cards 19f and 19g. The gray scale signals are then combined to display the original image. However, the storage signal from one of cards 19f and 19g may be reproduced to display an image although its resolution is degraded. The gray scale images stored in cards 19f and 19g are combined to display a composite image, thereby improving its resolution.

In the above embodiment, TV circuit 176 comprises a circuit for producing a normal television image. However, circuit 176 may be a character broadcast TV circuit for displaying a still image on the entire screen, a superimposed still image or superimposed characters. Character broadcast TV circuit 176 has substantially the same arrangement as that of FIG. 14, and a detailed description thereof will be omitted.

What is claimed is:

1. A compact liquid crystal television receiver having an information memory, comprising:
   television linear circuit means for receiving a television wave to produce video and audio signals;
   A/D converting means for sampling the video signal from said television linear circuit means and for converting the video signal into digital video data;
   memory means for storing information data;
   key input means including:
   a mode switch for selecting one of a television display mode and an information display mode,
   area designating means for reading out information data from part of a storage area of said memory means and designating a display area for displaying an image, and item data input means;

liquid crystal display means for displaying an image;

liquid crystal driving means, coupled to said A/D converting means and to said liquid crystal display means, for receiving digital video data output from said A/D converting means and information data output from said memory means and for display a television image and the information data on said liquid crystal display means;

control means coupled to said key input means and to said liquid crystal driving means, and in an information display mode for reading out the information data stored in a display area designating by said area designating means, for supplying the readout information data to said liquid crystal driving means, and for causing said liquid crystal display means to display the readout information data;

said control means further comprising an item data memory means for storing a table representing a one-to-one correspondence between display addresses of said memory means and predetermined item information, said item data memory means including:

means for searching a desired one of the display addresses in said item data memory to read out the desired display address, the desired display address corresponding to item information when item data is input upon operation of said item data input means, and means for reading out information data from a corresponding memory area in said memory means in response to the desired display address to drive said liquid crystal driving means, thereby causing said liquid crystal display means to display an image; and a case for accommodating said television linear circuit means, said A/D converting means, said memory means, said key input means, said liquid crystal display means, said liquid crystal driving means, and said control means.

2. A receiver according to claim 1, wherein said case comprises a memory mounting portion, and said memory means is detachably mounted in said memory mounting portion.

3. A receiver according to claim 1, wherein said memory means includes means for storing map information.

4. A receiver according to claim 1, wherein said memory means includes means for storing train time table information.

5. A receiver according to claim 1, wherein said memory means includes means for storing telephone directory information.

6. A receiver according to claim 1, wherein said television linear circuit includes television receiving means for receiving a character broadcast program (teletext).

7. A receiver according to claim 2, wherein said memory means comprises an IC card.

8. A receiver according to claim 7, wherein said IC card includes means for storing one-frame digital video data output from said A/D converting means.

9. A receiver according to claim 7, wherein said IC card includes means for storing an audio signal of a predetermined period of time output from said television linear circuit.

10. A compact liquid crystal television receiver having an information memory, comprising:

television linear circuit means for receiving a television wave to produce video and audio signals;

A/D converting means for sampling the video signal from said television linear circuit means and for converting the video signal into digital video data;

said television linear circuit means comprising a color television linear circuit for outputting an RGB signal, said A/D converting means including means for converting said RGB signal in units of color components to produce digital red data, digital green data, and digital blue data;

memory means for storing information data, said memory means comprising a plurality of IC cards for respectively storing said digital red data, said digital green data, and said digital blue data output from said A/D converting means;

key input means including a mode switch for selecting one of a television display mode and an information display mode;

liquid crystal display means for displaying an image;

liquid crystal driving means, coupled to said A/D converting means and to said liquid crystal display means, for receiving digital video data output from said A/D converting means and information data output from said memory means and for displaying a television image and the information data on said liquid crystal display means;

control means coupled to said key input means and to said liquid crystal driving means, and in an information data, for supplying the readout information data to said liquid crystal driving means, and for causing said liquid crystal display means to display the readout information data; and a case for accommodating said television linear circuit means, said A/D converting means, said memory means, said key input means, said liquid crystal display means, said liquid crystal display means, and said control means.

11. A compact liquid crystal television receiver having an information memory, comprising:

television linear circuit means for receiving a television wave to produce video and audio signals;

A/D converting means for sampling the video signal from said television linear circuit means and converting the video signal into digital video data;

said A/D converting means including means for sampling a video signal output from said television linear circuit N times per horizontal scanning line to convert the video signal into digital video data;

memory means for storing information data, said memory means comprising a plurality of IC cards for storing N pieces of said digital video data per scanning line by a plurality of cycles;

key input means including a mode switch for selecting one of a television display mode and an information display mode;

liquid crystal display means for displaying an image;

liquid crystal driving means, coupled to said A/D converting means and to said liquid crystal display means, for receiving digital video data output from said A/D converting means and information data output from said memory means and for displaying a television image and the information data on said liquid crystal display means;

control means coupled to said key input means and to said liquid crystal driving means, and in an information display mode for reading out the information data, for supplying the readout information data to said liquid crystal driving means, and for causing said liquid crystal display means to display the readout information data; and a case for accommodating said television linear circuit means, said A/D converting means, said memory means, said key input means, said liquid crystal display means, said liquid crystal driving means, and said control means.

12. A compact liquid crystal television receiver having an information memory, comprising:

television linear circuit means for receiving a television wave to produce video and audio signals;

A/D converting means for sampling the video signal from said television linear circuit means and converting the video signal into digital video data, said A/D converting means including means for converting a video signal output from said television linear circuit into gray scale data of A bits per dot;

memory means for storing information data;

key input means including a mode switch for selecting one of a television display mode and an information display mode;

liquid crystal display means for displaying an image;

liquid crystal driving means, coupled to said A/D converting means and to said liquid crystal display means, for receiving digital video data output from said A/D converting means and information data output from said memory means and for displaying a television image and the information data on said liquid crystal display means, said liquid crystal driving means including means for causing said liquid crystal display means to display an image, from data of which is M vertical dots×N horizontal dots×the A bits;

said memory means comprising a plurality of IC cards for storing the gray scale data of said A bits output from said A/D converting means by a plurality of cycles, digital video data of M dots×N dots×A' bits (where A'<A) being stored in different IC cards in each cycle;

control means coupled to said key input means and to said liquid crystal driving means, and in an information display mode for reading out the information data, for supplying the readout information data to said liquid crystal driving means, and for causing said liquid crystal display means to display the readout information data; and a case for accommodating said television linear circuit means, said A/D converting means, said memory means, said key input means, said liquid crystal display means, said liquid crystal driving means, and said control means.

13. A compact liquid crystal television receiver having an information memory, comprising:

television linear circuit means for receiving a television wave to produce video and audio signals;

A/D converting means for sampling the video signal from said television linear circuit means and for converting the video signal into digital video data;

memory means for storing data;

storing means, coupled to said A/D converting means for storing a plurality of divided-out data in said memory means said divided-out data comprising a portion of said digital video data;

key input means including a mode switch for selecting one of a television display mode and an information display mode;

liquid crystal display means for displaying an image;

liquid crystal driving means, coupled to said A/D converting means and to said liquid crystal display means, for receiving digital video data output from said A/D converting means and data output from said memory means and for displaying a television image and the data on said liquid crystal display means;

control means coupled to said key input means and to said liquid crystal driving means, and in an information display mode for reading out the data stored in said memory means, for supplying the readout data to said liquid crystal driving means, and for causing said liquid crystal display means to display the readout data; and a case for accommodating said television linear circuit means, said A/D converting means, said memory means, said key input means, said liquid crystal display means, said liquid crystal driving means, and said control means.

* * * * *